(12) United States Patent
Sakurai et al.

(10) Patent No.: US 9,738,302 B2
(45) Date of Patent: Aug. 22, 2017

(54) STEERING WHEEL

(71) Applicant: TOYODA GOSEI CO., LTD., Kiyosu-shi, Aichi-ken (JP)

(72) Inventors: Koji Sakurai, Kiyosu (JP); Norio Umemura, Kiyosu (JP); Naoki Tsukamoto, Kiyosu (JP); Hisatoshi Ota, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 36 days.

(21) Appl. No.: 14/645,679

(22) Filed: Mar. 12, 2015

(65) Prior Publication Data

US 2016/0023677 A1 Jan. 28, 2016

(30) Foreign Application Priority Data

Jul. 25, 2014 (JP) ................. 2014-152419

(51) Int. Cl.
| | |
|---|---|
| *B62D 1/04* | (2006.01) |
| *B62D 1/08* | (2006.01) |
| *H02K 5/00* | (2006.01) |
| *H02K 7/06* | (2006.01) |

(52) U.S. Cl.
CPC ............ *B62D 1/046* (2013.01); *B62D 1/08* (2013.01); *H02K 5/00* (2013.01); *H02K 7/061* (2013.01)

(58) Field of Classification Search
CPC .......... B62D 1/04; B62D 1/08; B62D 15/029; H02K 7/063
See application file for complete search history.

(56) References Cited

U.S. PATENT DOCUMENTS 6,327,932 B1* 12/2001 Onodera ............. B60Q 1/0082
74/552
7,852,225 B2 12/2010 Lemasson
(Continued)

FOREIGN PATENT DOCUMENTS

| DE | 102010029860 A1 * | 12/2011 | .............. B06B 1/04 |
| DE | 102010047160 A1 * | 4/2012 | ............. B62D 1/046 |
| EP | 0856432 A2 | 8/1998 | |

(Continued)

OTHER PUBLICATIONS

FR 1237828 A Translation.*

*Primary Examiner* — Vicky Johnson
(74) *Attorney, Agent, or Firm* — Posz Law Group, PLC

(57) ABSTRACT

A steering wheel provided with a vibration device. The vibration device includes a vibration motor with an eccentric weight attached to a rotational axis protruding out of a motor body and a mounting bracket which mounts the motor on a mounting section located at a region continuous with a ring section on a steering wheel core. The mounting section includes a vibration receiving section and a mounting base. The mounting bracket includes a pressing section which presses the motor body against the vibration receiving section and a mounting tongue which is secured to the mounting base. The mounting bracket is mounted on the mounting base with the motor body disposed on the pressing section in such a manner as to press a region of the motor body facing the vibration receiving section against the vibration receiving section and transmit a vibration of the motor body to the vibration receiving section.

3 Claims, 17 Drawing Sheets

(56) References Cited

U.S. PATENT DOCUMENTS

| | | | |
|---|---|---|---|
| 7,902,987 B2 * | 3/2011 | Lemasson | B60W 50/16 340/407.1 |
| 2016/0023667 A1 * | 1/2016 | Sakurai | B62D 6/008 74/552 |

FOREIGN PATENT DOCUMENTS

| | | | | |
|---|---|---|---|---|
| FR | 1237828 A * | 8/1960 | | H02K 7/063 |
| IT | EP 0856432 A2 * | 8/1998 | | B60Q 9/00 |
| JP | 2004-537452 A | 12/2004 | | |
| JP | 2009-132359 A | 6/2009 | | |
| JP | 2009-151775 A | 7/2009 | | |
| JP | 2010-241327 A | 10/2010 | | |
| JP | 2013-244767 A | 12/2013 | | |
| WO | 03/012557 A2 | 2/2003 | | |

* cited by examiner

STEERING WHEEL

CROSS REFERENCE TO RELATED APPLICATIONS

The Present application claims priority from Japanese Patent Application No. 2014-152419 of Sakurai et al., filed on Jul. 25, 2014, the disclosure of which is hereby incorporated into the present application by reference.

BACKGROUND OF THE INVENTION

1. Field of the Invention

The present invention relates to a steering wheel provided with a vibration device that transmits vibration to the driver holding a ring section of the steering wheel.

2. Description of Related Art

U.S. Pat. No. 7,852,225 discloses a steering wheel which is equipped with a vibration device which causes vibration on a ring section of the steering wheel to warn the driver holding the ring section in such an instance where his vehicle is about to leave the lane. In this steering wheel, the vibration device is mounted on a spoke region of a core of the steering wheel. The vibration device includes a vibration motor and a fixing bracket which mounts the vibration motor on the spoke region of the core. The vibration motor includes a rotational axis protruding out of a motor body and an eccentric weight connected to the rotational axis. The fixing bracket includes a holding section which holds end sections of the vibration motor from which the rotational axis protrudes and mounting sections extending from opposite sides of the holding section and secured to the core of the steering wheel.

In the above steering wheel, only the mounting sections of the fixing bracket are connected to the core, while the holding section of the fixing bracket and the vibration motor are separate from the core. That is, it is not that the motor body directly presses the core when vibrating. This configuration has a room for improvement in effectively transmitting vibration caused by the vibration motor to the core.

SUMMARY OF THE INVENTION

An object of the present invention is to provide a steering wheel in which vibration caused by a vibration motor effectively transmits to a ring section of the steering wheel.

The steering wheel of the invention includes a steering wheel body and a vibration device which transmits vibration to a driver. The steering wheel body includes a generally annular ring section for holding for steering, a boss section disposed at a center of the ring section and secured to a steering shaft, a spoke interconnecting the ring section and the boss section, and a core which has such a contour that the ring section, the boss section and the spoke are interconnected.

The vibration device includes a vibration motor which includes a motor body, a rotational axis protruding out of the motor body and an eccentric weight attached to the rotational axis, and a mounting bracket which mounts the vibration motor on a mounting section formed at a region continuous with the ring section on the core.

The mounting section formed on the core includes a vibration receiving section which receives vibration of the motor body of the vibration motor and mounting bases which are located on opposite sides of the vibration receiving section.

The mounting bracket includes a pressing section in which the motor body is disposed and mounting tongues that extend from opposite sides of the pressing section and are secured to the mounting bases of the mounting section with fixing means, respectively. The pressing section presses a distant region of an outer circumference of the motor body, which faces away from the vibration receiving section, toward the vibration receiving section.

The mounting tongues of the mounting bracket are mounted on the mounting bases with the motor body disposed on the pressing section such that an approximate region of the outer circumference of the motor body facing the vibration receiving section is pressed against the vibration receiving section and a vibration of the motor body transmits to the vibration receiving section.

With the steering wheel of the invention, if the vibration motor of the vibration device is actuated, the motor body will vibrate with the eccentric weight rotating. Since the pressing section of the mounting bracket presses the approximate region on the outer circumference of the motor body against the vibration receiving section, a vibration of the motor body will directly transmit to the vibration receiving section. Mounted on a region of the core continuous with the ring section of the steering wheel body, the vibration receiving section will be capable of vibrating the ring section effectively.

Therefore, with the steering wheel of the invention, a vibration caused by the vibration motor will effectively transmit to the ring section.

In the steering wheel configured as above, it is desired that the mounting section is located at a region of the spoke of the core, and that the vibration motor is so disposed that an axial center of the rotational axis extends parallel to a ring forming plane of the ring section.

When the vibration motor is actuated, since the leading end of the rotational axis with the eccentric weight rotates about the axial center of the rotational axis while flexing, the motor body vibrates in a direction perpendicular to the rotational axis. With the above-described configuration, since the axial center of the rotational axis is arranged parallel to the ring forming plane of the ring section, the motor body will vibrate in a direction perpendicular to the ring forming plane, and so will the vibration receiving section synchronized with the motor body. Further, since the ring section is supported by the boss section secured to the steering shaft in a cantilevered fashion through the medium of the spoke, if the vibration receiving section vibrates in a direction perpendicular to the ring forming plane, the ring section will vibrate easily in a direction of the steering shaft. Furthermore, since the vibration of the motor body occurs at the vibration receiving section which is located on the spoke between the ring section and the boss section as the supporting point, the vibration will transmit to the ring section in an amplified fashion in direct proportion of a distance between the boss section and the motor body to a distance between the boss section and the ring section.

As a consequence, the above configuration will be capable of generating a great (strong) and sufficiently perceivable vibration at the ring section even if the vibration of the vibration motor is small (weak).

In the steering wheel of the invention, it is further desired that the steering wheel further includes between the vibration receiving section and the approximate region of the outer circumference of the motor body an elastically deformable spacer, and that the spacer is in such an elastically deformed state with a repulsive force as to be capable of transmitting a vibration of the motor body to the vibration receiving section as a result of approximation of the approximate region toward the vibration receiving section.

With this configuration, the spacer, by its elastic deformation allowance, will absorb any assembling error which can arise between the vibration receiving section of the steering wheel body and the motor body pressed toward the vibration receiving section by the pressing section of the mounting bracket due to a dimension error in the mounting tongues and the pressing section of the mounting bracket or in the mounting bases and the vibration receiving section of the steering wheel body. Moreover, since the spacer is so elastically deformed as to be capable of transmitting vibration of the motor body to the vibration receiving section (in other words, since the spacer is elastically deformed considerably to such an extent that the spacer no longer deforms by the vibration of the motor body), the spacer will be capable of transmitting vibration of the motor body to the vibration receiving section adequately.

When the steering wheel includes such a spacer, it is desired that:
    the approximate region of the motor body includes a circular-arc planar outer circumference extending about an axial center of the rotational axis; and
    the spacer is composed of a flat spring material and includes:
        core-side contact regions that are located at opposite end regions of the spacer for abutment against the vibration receiving section;
        legs that extend toward the motor body from opposing edges of the core-side contact regions;
        a motor-side contact region that is so formed as to connect leading ends of the legs together;
        a housing hole that penetrates the motor-side contact region and the legs for housing part of the circular-arc planar outer circumference of the approximate region of the motor body;
        supporting edges that are composed of opposite edges of the motor-side contact region which oppose each other in a direction perpendicular to the axial center of the rotational axis in a periphery of the housing hole and abut against and hold the circular-arc planar outer circumference of the approximate region of the motor body along the axial center of the rotational axis; and
        an assembling section that extends from at least one of the core-side contact regions and is clamped between the pressing section of the mounting bracket and the motor body and assembled with the motor body.

With this configuration, when assembling the vibration device, the assembling section is firstly assembled with the motor body such that the approximate region of the motor body fits in the housing hole of the spacer, and then the motor body is set in the pressing section of the mounting bracket. Then the core-side contact regions of the spacer are applied against the vibration receiving section so the approximate region of the motor body faces the vibration receiving section, and then the mounting tongues are secured to the mounting section, thus the pressing section of the mounting bracket presses the distant region of the motor body toward the vibration receiving section.

At this time, the spacer is fixed between the vibration receiving section and the approximate region of the motor body with the supporting edges of the motor-side contact region abutting against the approximate region of the motor body and with the core-side contact regions contacting the vibration receiving section and is elastically deformed by the legs in such a manner as to transmit a vibration of the motor body to the vibration receiving section.

Moreover, when the motor body, the spacer and the mounting bracket are assembled together, since the supporting edges opposing each other in a periphery of the housing hole abut against the circular-arc planer outer circumference of the approximate region of the motor body along the axial center of the rotational axis, the spacer will be fixedly positioned between the approximate region of the motor body and the vibration receiving section without slipping in a circumferential direction of the motor body. Further, since the assembling section is clamped between the motor body and the pressing section of the mounting bracket, the spacer will not come off the motor body when the mounting tongues are mounted on the mounting bases on the core.

With this configuration, having the approximate region of the motor body fitted in the housing hole, the spacer is assembled with the vibration motor with no fear of slipping. Accordingly, if the vibration motor is set in the pressing section of the mounting bracket and the mounting tongues are mounted on the corresponding mounting bases with fixing means, the vibration device is easily mounted on the steering wheel body with no separate means for holding the spacer, in such a manner that the vibration motor is capable of pressing the vibration receiving section.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
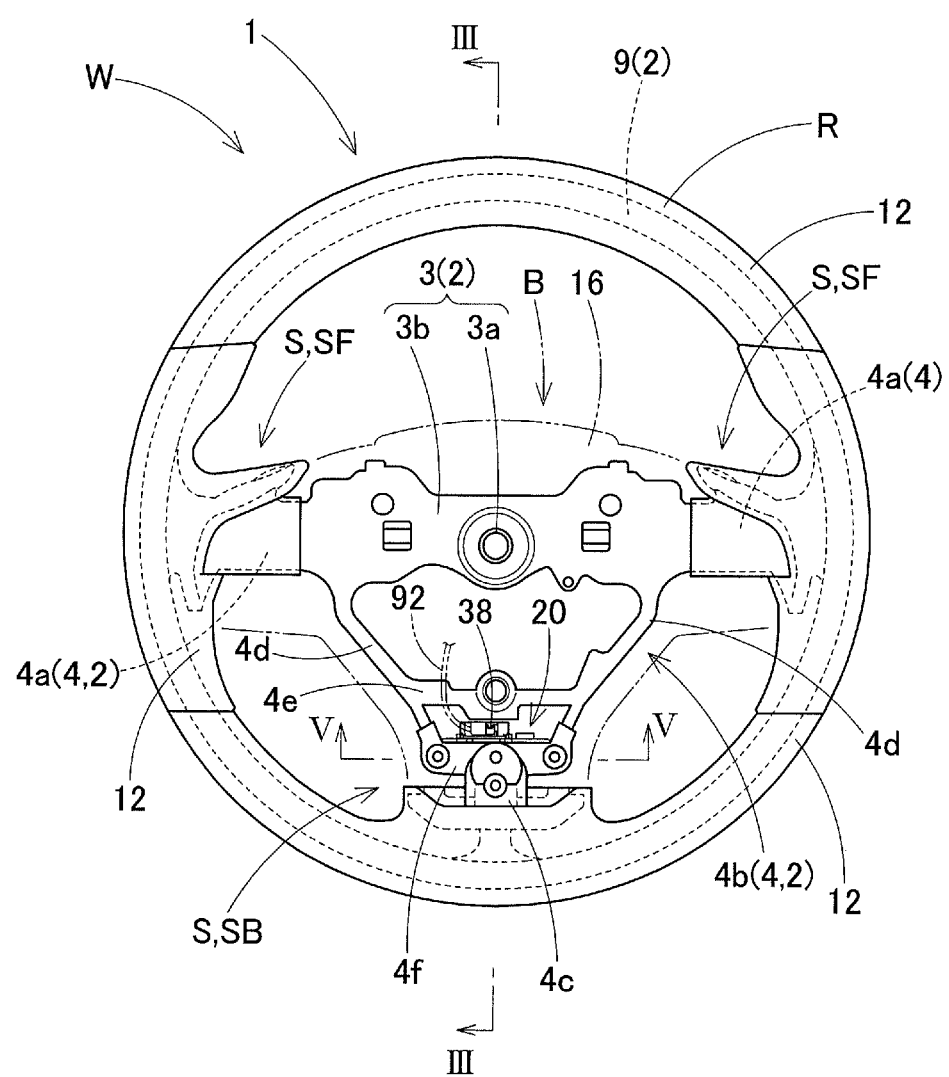
FIG. 1 is a schematic plan view of a steering wheel embodying the invention.
Figure 2:
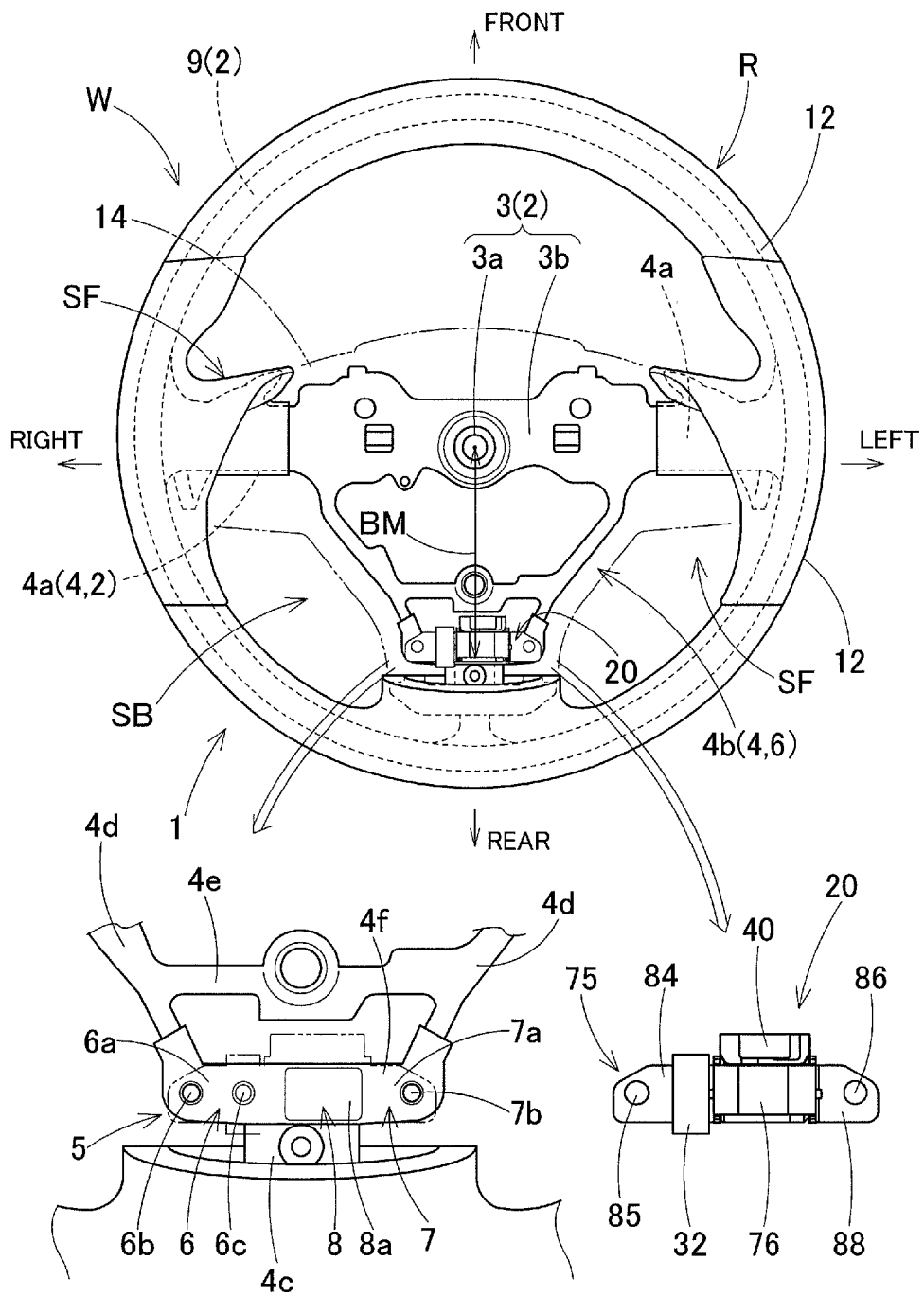
FIG. 2 is a schematic bottom view of the steering wheel of FIG. 1 showing schematic enlarged views of a vibration device and a mounting section of the vibration device as well.
Figure 3:
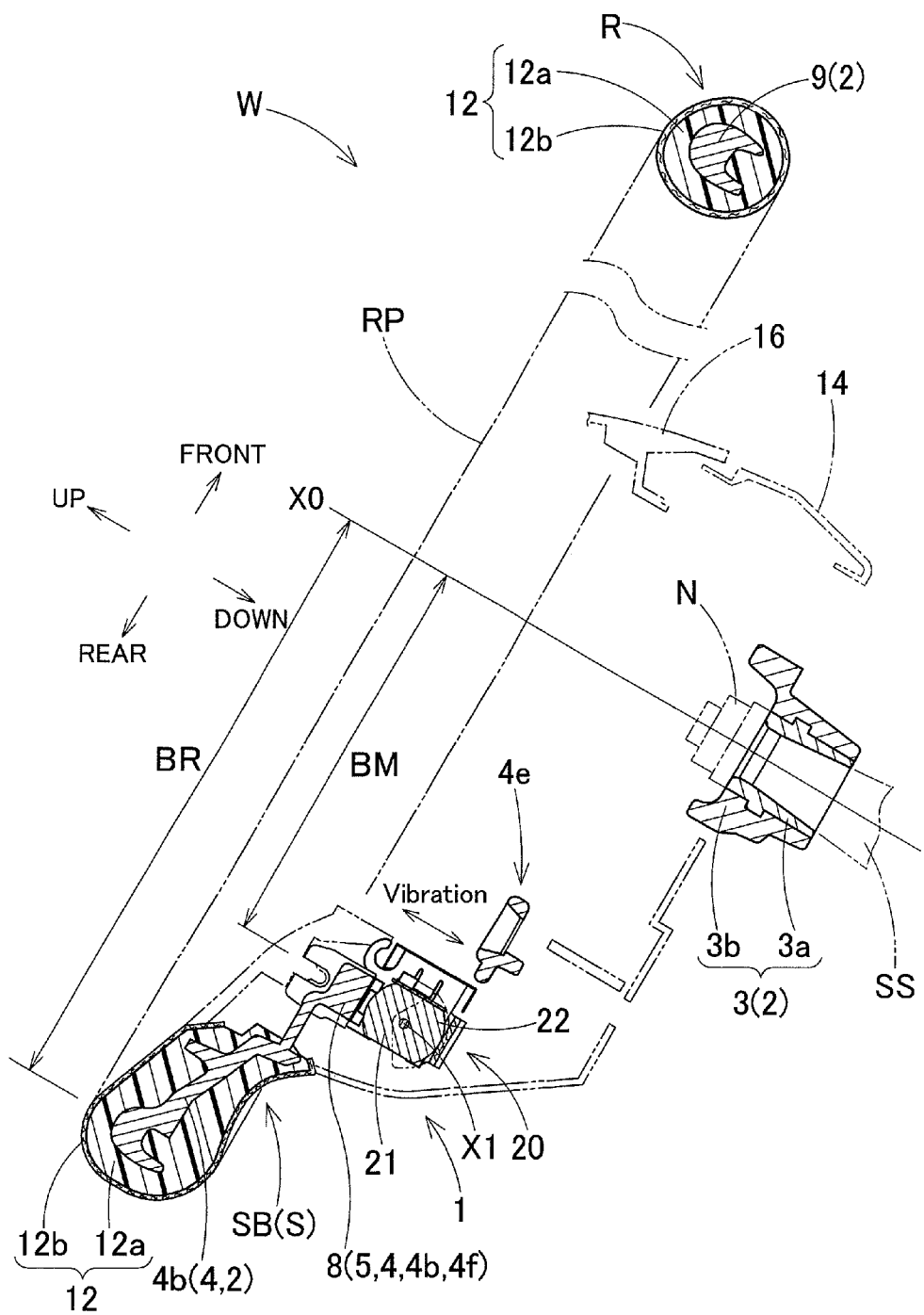
FIG. 3 is a schematic vertical section of the steering wheel of FIG. 1 taken along line III-III of FIG. 1.

As shown in FIGS. 1 to 3, a steering wheel W embodying the invention includes a vibration device 20 and a wheel body 1. The wheel body 1 includes a generally annular ring section R, a boss section B and a plurality of (three, in the illustrated embodiment) spokes S. The ring section R is for holding at steering operation. The boss section B is disposed at the center of the ring section R and is secured to a steering shaft SS. The spokes S interconnect the boss section B and the ring section R. The steering wheel body 1 includes a core 2 which has such a contour that the ring section R, boss section B and spokes S are interconnected. The core 2 includes a boss core section 3 located at the boss section S, a spoke core section 4 located at the spokes S and a ring core section 9 located at the ring section R.

A boss 3a of the boss core section 3 is made from steel, and other sections, i.e., a boss plate section 3b of the boss core section 3, which is arranged around the boss 3a, the spoke core section 4, and the ring core section 9 are die cast from such light alloy metal as aluminum alloy. The boss 3a of the boss core section 3 is connected to a steering shaft SS which is inserted through the boss 3a and nut N fixed thereto.

The spoke core section 4 includes front sections 4a and 4b which are located at front left and right spokes SF and extend toward left and right from the boss plate section 3b, and a rear section 4b located at a rear spoke SB. The rear section 4b includes a main body 4c which extends forward from a rear end region of the ring core section 9, bifurcate sections 4d which bifurcate toward left and right in a vicinity of the front end of the main body 4c and are connected to left and right end regions of the boss plate section 3b and transverse bars 4e and 4f which connect the bifurcate sections 4d together at a vicinity of the main body 4c and are arranged one behind the other.

The wheel body 1 is covered with a cladding layer 12 at the ring core section 9 and a region of the spoke core section 4 adjoining the ring core section 9. The cladding layer 12 is composed of a resin region 12a of urethane or the like and a leather 12b mounted on an outer circumference of the resin region 12a.

Underneath the boss section B is a lower cover 14 made from synthetic resin. On top of the boss section B is a pad 16 provided with an unillustrated airbag device.

Figure 4A:
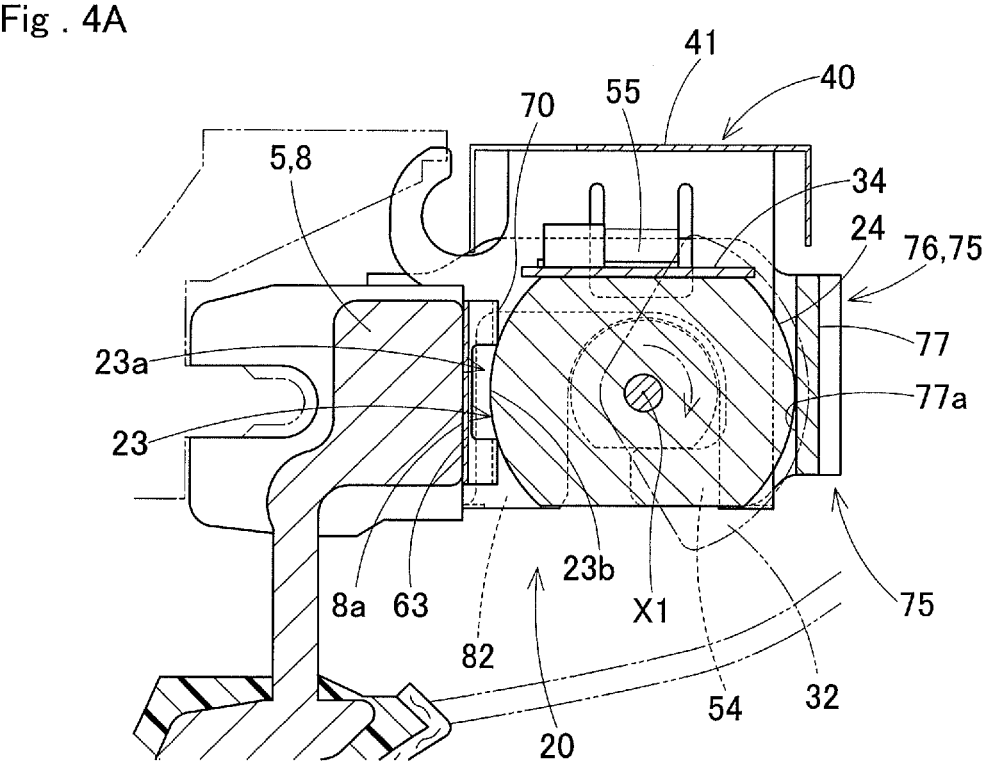
FIG. 4A is an enlarged vertical section of a vicinity of the vibration device in the steering wheel of FIG. 1.
Figure 4B:
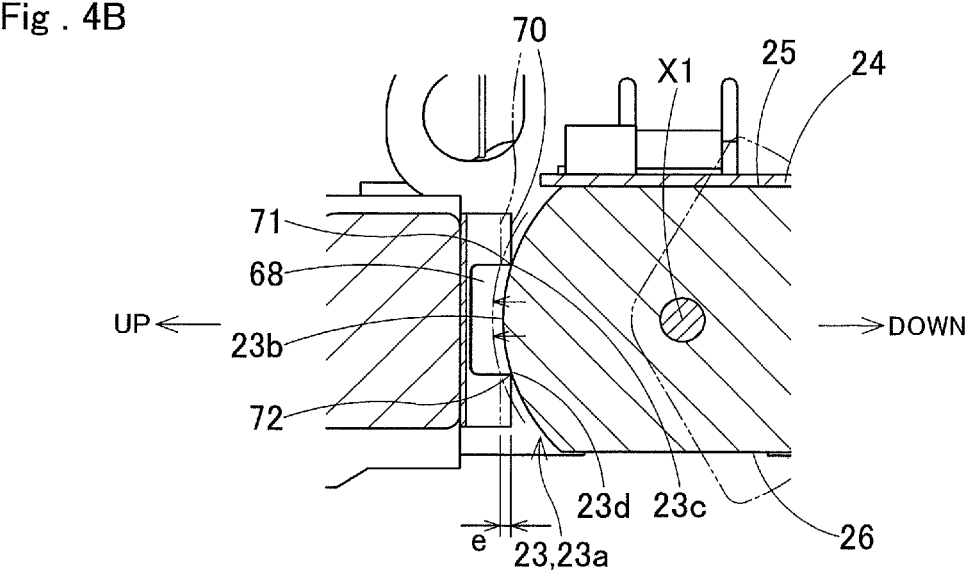
FIG. 4B illustrates a deforming amount of a spacer.
Figure 5A:
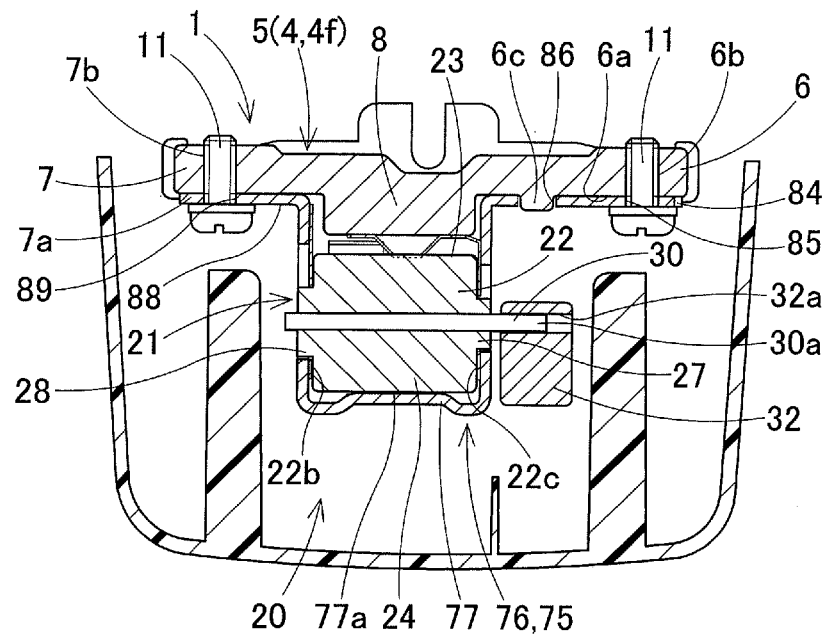
FIG. 5A is a schematic vertical section taken along line V-V of FIG. 1.

As shown in FIGS. 3 to 5, at the rear spoke SB, a mounting section 5 is provided on an underside of the rear transverse bar 4f of the spoke core section 4. The vibration device 20 is mounted on the mounting section 5. The mounting section 5 is located at the rear of the boss 3a as the steering wheel W is steered straight ahead and in a vicinity of a center in a left and right direction of the ring section R. The mounting section 5 includes at the center a vibration receiving section 8 which is a generally rectangular parallelepiped in shape and protrudes downwardly, and on left and right sides of the vibration receiving section 8 are mounting bases 6 and 7. Each of the mounting bases 6 and 7 includes a mounting hole 6b/7b, which is a screw hole, extending along an axial center XO of the steering shaft SS and of the boss 3a. The mounting base 6 further includes a projection 6c which protrudes downwardly in a columnar shape.

Base planes or undersides 6a, 7a and 8a of the mounting bases 6 and 7 and of the vibration receiving section 8 are perpendicular to the axial center XO of the boss 3a and parallel to a ring forming plane RP of the ring section R.

Referring to FIGS. 4 to 13, the vibration device 20 includes a vibration motor 21 which is provided with a weight 32 and a mounting bracket 75. The vibration device 20 of this specific embodiment further includes a clip 40 which is provided with a spacer 60 located between the vibration motor 21 and the vibration receiving section 8, and a circuit board 34 which includes a connector 38 to which a lead wire 92 (FIGS. 1, 6 and 7) is connected for feeding the vibration motor 21 with an electric power (DC12V).

The vibration motor 21 includes a motor body 22 and a rotational axis 30 which protrudes out of a first end plane 22b of the motor body 22. With regions on an outer circumference 22a which oppose each other in a direction orthogonal to the axial center X1 of the rotational axis 30 cut out in a planar fashion, the motor body 22 is formed into a generally column having an oval sectional shape. That is, the outer circumference 22a of the motor body 22 includes two circular-arc planar regions 23 and 24 and two flat regions 25 and 26. The circular-arc planar region 23 serves as an approximate region 23 which approximates to the vibration receiving section 8 and the other circular-arc planar region 24 serves as a distant region 24 which faces away from the vibration receiving section 8.

Figure 7:
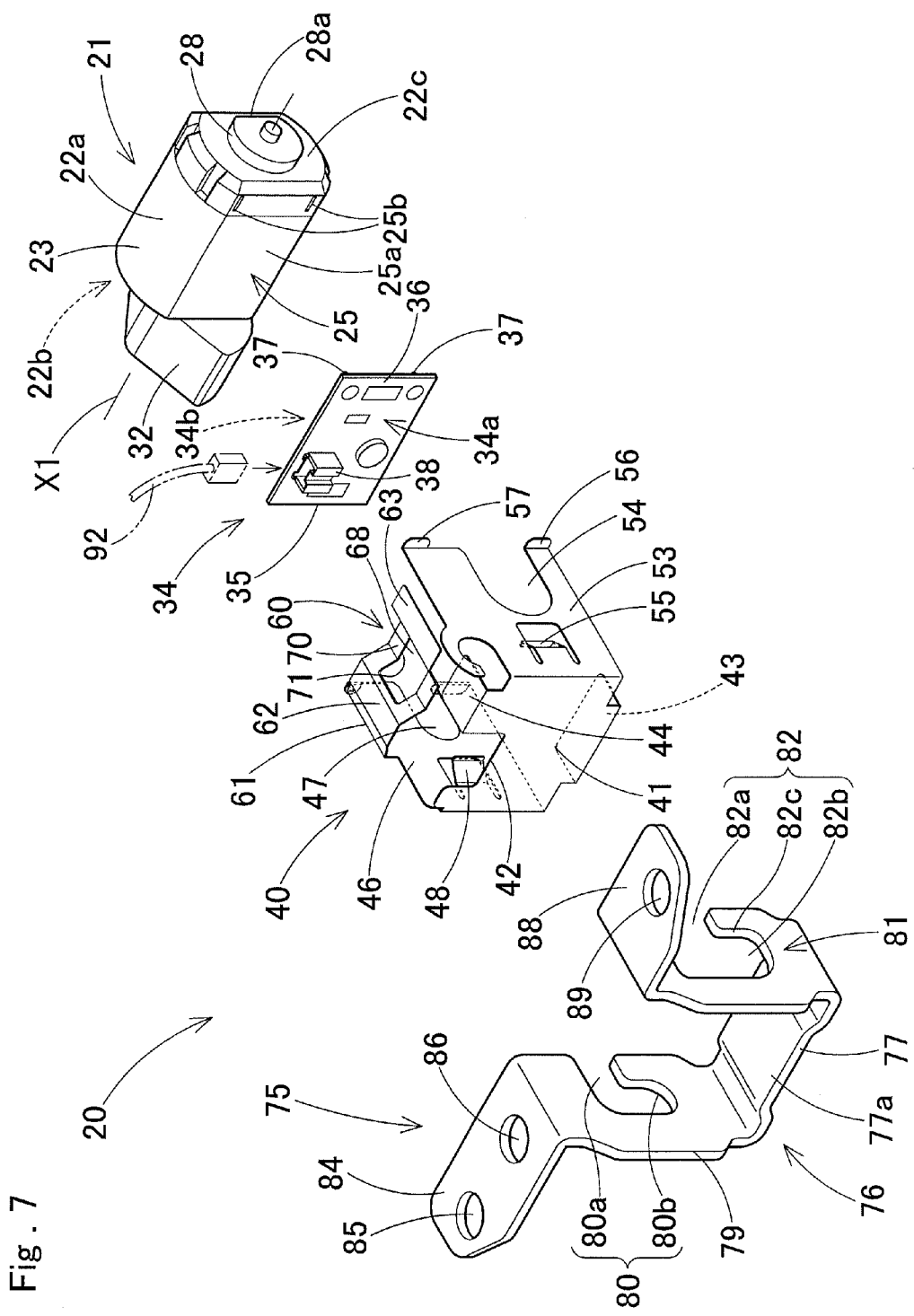
FIG. 7 is an exploded perspective view of the vibration device as viewed from the back side of the vibration device (i.e., as viewed from the front in a front and rear direction)

As shown in FIG. 7, the flat region 25 of the outer circumference 22a serves as a mounting base 25 on which the circuit board 34 is mounted, and includes at a peripheral region close to a second end plane 22c of the motor body 22 two terminal holes 25b in which terminals 37 of the circuit board 34 are plugged for feeding DC voltage. A base plane 25a of the mounting base 25 is a flat plane. When the circuit board 34 is assembled with the mounting base 25 with the terminals 37 plugged in the terminal holes 25b, a back face 34b of the circuit board 34 abuts against the base plane 25a generally entirely.

The circuit board 34 further includes on the surface 34a a connector 38 to which the lead wire 92 (FIGS. 1, 6 and 7) is connected for feeding the vibration motor 21 with an electric power (DC12V) and an electronic circuit (reference numeral omitted) provided with an IC chip for removing electric noises.

The motor body 22 further includes on both of the end planes 22b and 22c pivotally-support sections (projecting sections) 27 and 28 projecting outwardly, and the rotational axis 30 protrudes longer out of the pivotally-support section 27 than from the pivotally-support section 28. The pivotally-support section 28 on the end plane 22c facing away from the weight 32 has a greater outer diameter than the pivotally-support section 27 and is formed into an odd-shaped column, not into a circular column, with a flat region 28a at a rear outer circumference, unlike the pivotally-support section 27 which has a circular columnar shape.

The weight 32 attached to the rotational axis 30 is formed into a generally ⅓ circular plate with a certain thickness and includes at an eccentric position an engagement hole 32 engageable with the rotational axis 30.

As shown in FIGS. 4A to 13, 18 and 19, the mounting bracket 75 is made of sheet metal and includes a pressing section (or holding section) 76 which holds the vibration motor 21 in such a manner as to press the motor 21 toward the vibration receiving section 8 of the mounting section 5 of the core 2, and mounting tongues 84 and 88 which extend toward left and right from the pressing section 76 and are mounted on the mounting bases 6 and 7 of the mounting section 5, respectively.

The mounting tongue 84 corresponds to the mounting base 6, and includes a mounting hole 85 for receiving a screw (or fixing means) 11 which is fastened into the mounting hole 6b of the mounting base 6 when fixing the mounting tongue 84 to the mounting base 6. The mounting tongue 84 further includes a fit-in hole 86 for receiving the projection 6c. The mounting tongue 88 corresponds to the mounting base 7 and includes a mounting hole 89 for receiving a screw 11 which is fastened into the mounting hole 7b of the mounting base 7 when fixing the mounting tongue 88 to the mounting base 7.

The pressing section 76 has a curved shape with a U-shaped sectional shape and includes mounting walls (holding walls) 79 and 81 which are opposed to each other in a left and right direction extending along an axial center X1 of the rotational axis 30 of the vibration motor 21 and a pressing wall (connecting wall) 77 which connects the mounting walls 79 and 81 together. The pressing wall 77 includes a pressing plane 77a which is formed into a generally rectangle and abuts against the distant region 24 of the outer circumference 22a of the motor body 22 which is located away from the vibration receiving section 8. The pressing plane 77a is so configured as to be raised from left and right edges of the mounting walls 79 and 81.

The mounting wall 79 is located on the side of the end plane 22b of the motor body 22 and includes an assembling recess (holding recess) 80 for receiving the pivotally-support section 27 provided with the weight 32. The assembling recess 80 includes an insertion opening 80a which extends forward from the rear edge of the mounting wall 79 and a fit-in region 80b which bends downwardly at the front end of the insertion opening 80a in a perpendicular fashion. A lower end of the fit-in region 80b is formed into a semicircular shape and the fit-in region 80b is so shaped and sized that the pivotally-support section 27 fits in the lower end.

The mounting wall 81 is located on the side of the end plane 22c of the motor body 22 and includes an assembling recess (holding recess) 82 for receiving the odd-shaped pivotally-support section 28. The assembling recess 82 includes an insertion opening 82a which extends forward from the rear edge of the mounting wall 81 and a fit-in region 82b which bends downwardly at the front end of the insertion opening 82a and is provided with a planar region 82c slidable with the flat region 28a of the pivotally-support section 28. A lower end of the fit-in region 82b is formed into such a generally semicircular shape as to correspond to an outer contour of a lower region of the pivotally-support section 28 with the flat region 28a, and the fit-in region 82b is so shaped and sized that the pivotally-support section 28 fits in the lower end.

The assembling recesses 80 and 82 are so designed that the distant region 24 of the motor body 22 abuts against the pressing plane 77a of the pressing wall 77 in the pressing section 76 when the pivotally-support sections 27 and 28 of the motor body 22 are set in the corresponding fit-in regions 80b and 82b.

As shown in FIGS. 4A to 17, the clip 40 is punched out in a predetermined shape out of a thin flat spring material with a thickness t (FIG. 11) of about 0.2 mm and shaped by bending work. The clip 40 includes assembling sections (assembling plate sections) 46 and 53 which are opposed to each other along an axial center X1 of the rotational axis 30 of the vibration motor 21 and a connection wall (connection plate section) 41 which connects the assembling sections 46 and 53 together, thus has a generally U-shaped sectional shape. Further, a spacer 60 extending from an edge 51 of the assembling section 46 in a curving fashion and having a generally rectangular plate shape is integrated into the clip 40. The clip 40 holds the circuit board 34, which is assembled with the vibration motor 21 with the terminals 37 plugged in the terminal holes 25b, against the vibration motor 21 as well as functions as the spacer 60 which absorbs any assembling error between the vibration motor 21 and vibration receiving section 8 in order to transmit vibration of the motor body 22 to the vibration receiving section 8 smoothly.

The connection wall 41 is so arranged as to cover the circuit board 34 assembled with the vibration motor 21 and includes extended regions 43 and 44 which extend rearward from upper and lower edges of the connection wall 41 for protecting various IC chips of the circuit board 34. At an upper periphery of the connection wall 41 is a recess 42 for receiving the connector 38 of the circuit board 34 for facilitating the connecting work of the lead wire 92 to the connector 38.

The assembling section 46 is located on the side of the end plane 22b of the motor body 22 and includes an assembling recess 47 engageable with the pivotally-support section 27 provided with the weight 32. The assembling recess 47 extends forward from the rear edge of the assembling section 46 in a shape of an elongated hole and is shaped into a semicircle at the front end. The assembling recess 47 is so shaped and sized that the pivotally-support section 27 fits in the front end. The assembling section 46 further includes at its peripheral region on the side of the connection wall 41 a holding stop 48 which is cut and raised inward and extends rearward in a generally rectangular plate shape. The holding stop 48 pushes a right edge 35 of the circuit board 34 toward the mounting base 25 and prevents the circuit board 34 from being disengaged from the vibration motor 21. The holding stop 48 includes a main body 48a which is located at a root region and a contact region 48b which is bent from the main body 48a and extends flatly along the surface 34a of the circuit board 34 so as to push the surface 34a.

Figure 22A:
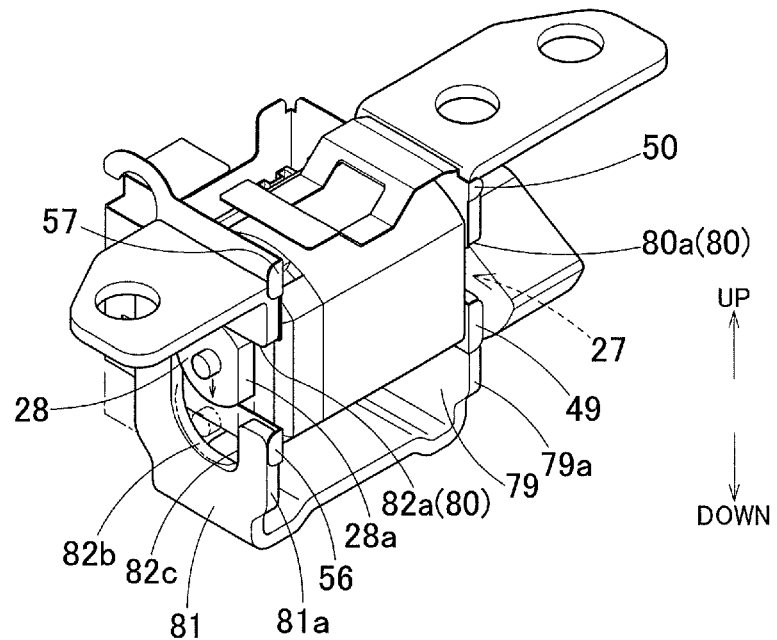
FIGS. 22A and 22B illustrate in order the way the mounting bracket is mounted on the vibration motor assembled with the circuit board and clip.

The assembling section 46 further includes at upper and lower regions of the rear edge retaining pawls 49 and 50 which bend outwardly for engagement with a rear end face 79a of the mounting wall 79 of the mounting bracket 75 for stabilizing the posture of the clip 40 inside the pressing section 76 of the mounting bracket 75 (FIG. 22).

The assembling section 53 is located on the side of the end plane 22c of the motor body 22 and includes an assembling recess 54 engageable with the pivotally-support section 28. The assembling recess 54 extends forward from the rear edge of the assembling section 53 in a shape of an elongated hole and is shaped into a semicircle at the front end. The assembling recess 54 is so shaped and sized as to receive a columnar region of the pivotally-support section 28 facing away from the flat region 28a in a fitted fashion by the front end. The assembling section 53 further includes at its peripheral region on the side of the connection wall 41 a holding stop 55 which is cut and raised inward and extends rearward in a generally rectangular plate shape. In a similar fashion to the holding stop 48, the holding stop 55 pushes a left edge 36 of the circuit board 34 toward the mounting base 25 and prevents the circuit board 34 from being disengaged from the vibration motor 21. The holding stop 55 also includes a main body 55a which is located at a root region and a contact region 55b which is bent from the main body 55a and extends flatly along the surface 34a of the circuit board 34 so as to push the surface 34a.

The assembling section 53 further includes at upper and lower region of the rear edge retaining pawls 56 and 57 which bend outwardly for engagement with a rear end face 81a of the mounting wall 81 of the mounting bracket 75 for stabilizing the posture of the clip 40 inside the pressing section 76 of the mounting bracket 75 (FIG. 22).

The contact regions 48b and 55b of the holding stops 48 and 55 of the clip 40 are so arranged as to oppose a forming direction of the assembling recesses 47 and 54 of the assembling sections 46 and 53, i.e., a direction heading from the rear to front, and the retaining pawls 49, 50, 56 and 57 are formed at such positions as to be engageable with the rear end faces 79a and 81a of the mounting bracket 75 when the clip 40 is assembled with the mounting bracket 75. That is, the holding stops 48 and 55 are distant from the retaining pawls 49, 50, 56 and 57 in the forming direction of the assembling recesses 47 and 54 or in an inserting direction of the terminals 37 of the circuit board 34 into the terminal holes 25b, i.e., in a front and rear direction. In other words, the contact regions 48b and 55b of the holding stops 48 and 55 oppose the retaining pawls 49, 50, 56 and 57 in a front and rear direction.

Further, the assembling section 53 includes at the upper edge a hook 58 for retaining the lead wire 92.

The spacer 60 extends in a left and right direction toward the assembling section 53 through the medium of a joint region 61 which extends upward from a rear region of the upper edge 51 of the assembling section 46 and bends toward the left, thus having a L-shaped sectional shape. The spacer 60 includes core-side contact regions 62 and 63, a motor-side contact region 70, legs 65 and 66 and a rectangular housing hole 68 formed over the motor-side contact region 70 and the legs 65 and 66.

The core-side contact regions 62 and 63 are located at left and right regions of the spacer 60 and are formed into a flat plane, respectively, for abutment against the base plane 8a of the vibration receiving section 8. The legs 65 and 66 extend obliquely downwardly toward the motor body 22 from opposing edges of the core-side contact regions 62 and 63 in an approaching fashion to each other. The motor-side contact region 70 is so formed as to connect leading ends 65a and 66a of the legs 65 and 66 together into a flat plane generally parallel to the core-side contact regions 62 and 63.

The housing hole 68 penetrates the motor-side contact region 70 and legs 65 and 66 in an up and down direction and is formed into a rectangle in which short sides oppose each other in a left and right direction as viewed from above, so as to house part of a circular-arc planar outer circumference 23a of the approximate region 23 of the motor body 22. A center in a front and rear direction of the housing hole 68 is located immediately above the axial center X1 of the rotational axis 30. Opposite edges of the motor-side contact region 70 which oppose each other in a direction perpendicular to the axial center X1 of the rotational axis 30 in a periphery of the housing hole 68 serve as supporting edges 71 and 72 which abut against and hold the circular-arc planar outer circumference 23a of the approximate region 23 of the motor body 22 housed in the housing hole 68 along the axial center X1 of the rotational axis 30.

Figure 11A:
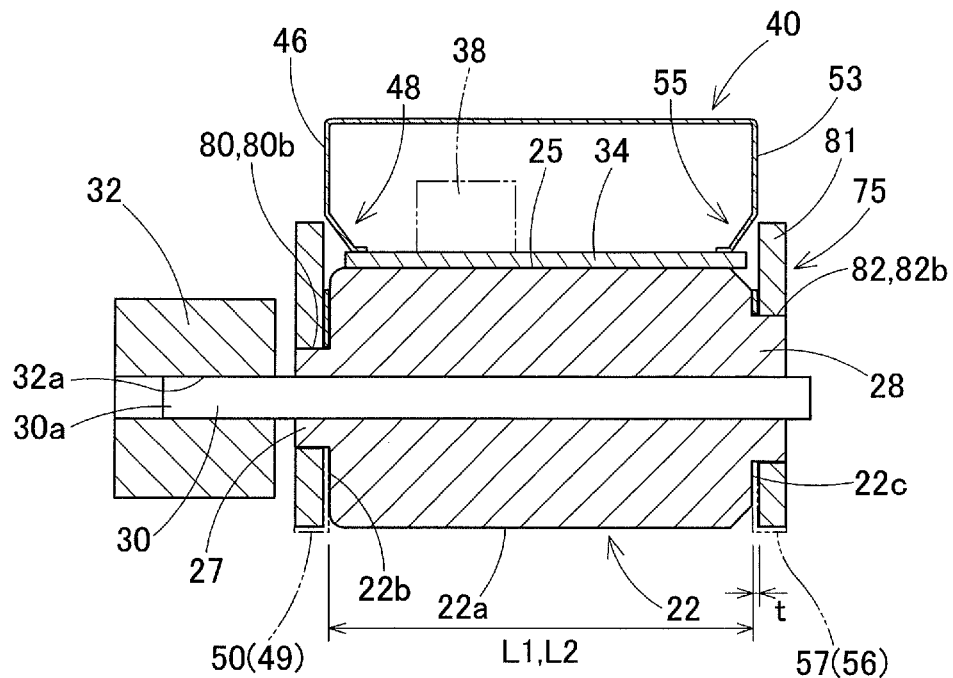
FIG. 11A is a schematic end view of the vibration device taken along line XI-XI in FIG. 10.
Figure 11B:
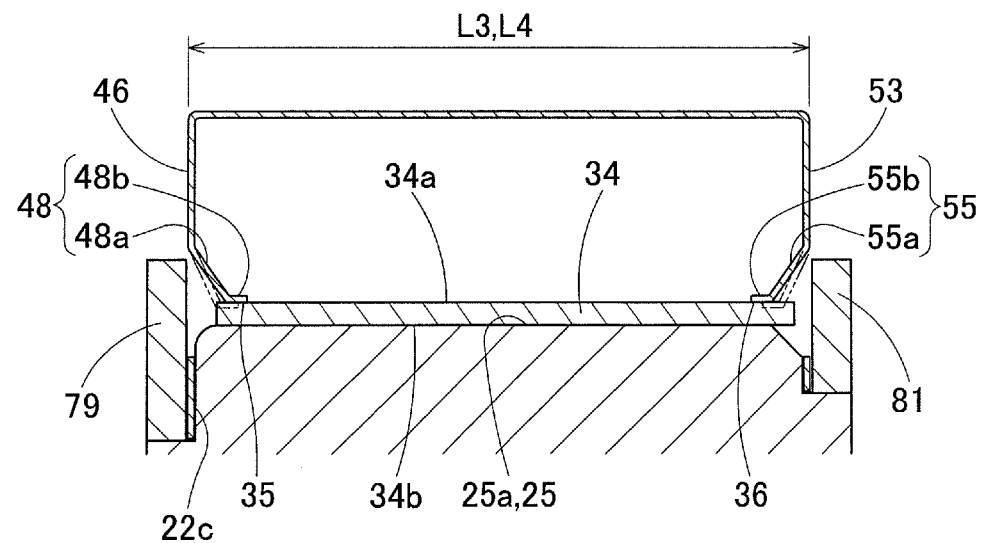
FIG. 11B illustrates the way the holding stops deform.
Figure 12:
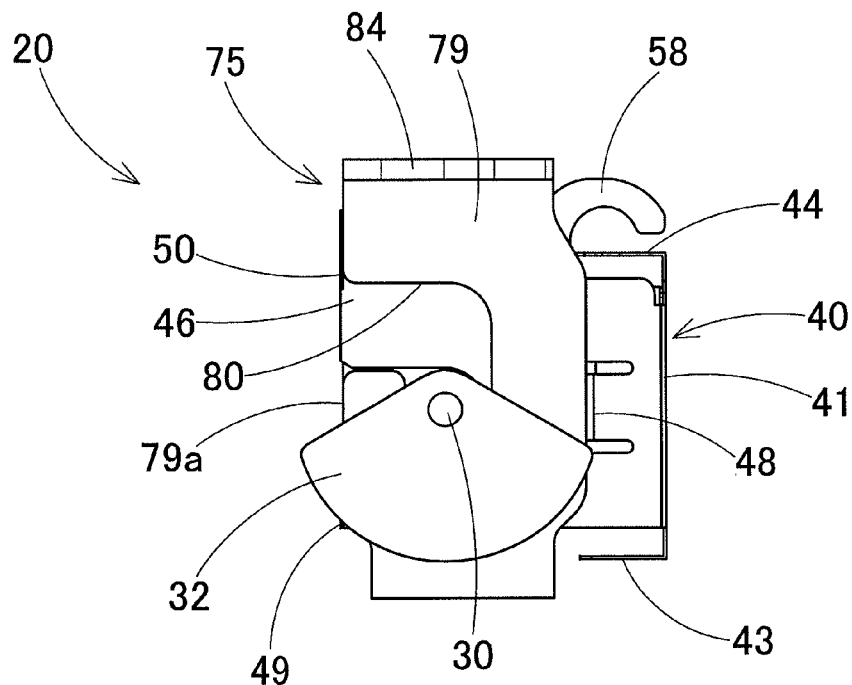
FIG. 12 is a right side view of the vibration device.
Figure 13:
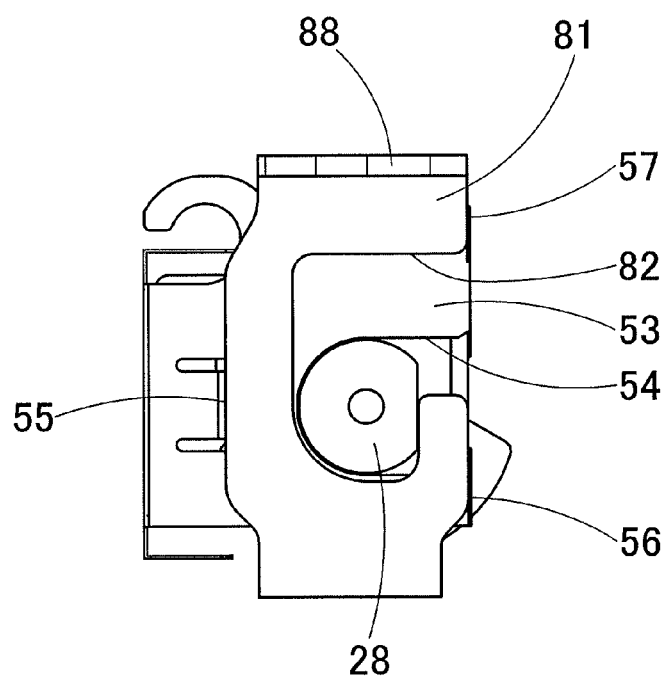
FIG. 13 is a left side view of the vibration device.
Figure 14:
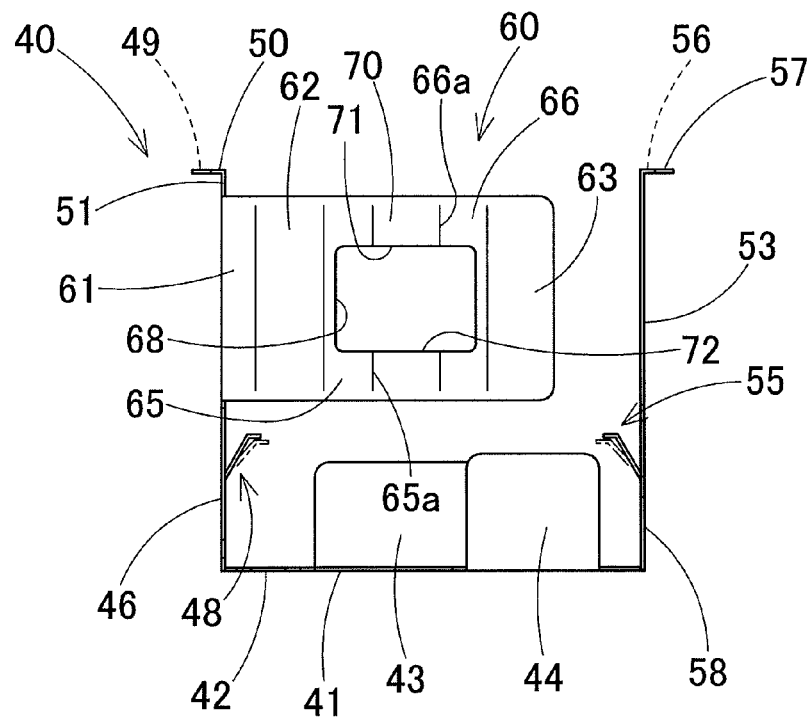
FIG. 14 is a plan view of the spacer.

As shown in FIG. 11A, a length L2 of an inner region between the assembling sections 46 and 53 of the clip 40, i.e., a distance between the assembling sections 46 and 53, is generally equal to a length L1 between the end planes 22b and 22c of the motor body 22 of the vibration motor 21 such that the motor body 22 fits in between the assembling sections 46 and 53. As shown in FIG. 11B, a length L4 of an inner region between the mounting walls 79 and 81 of the mounting bracket 75, i.e., a distance between the mounting walls 79 and 81, is generally equal to a length L3 of an outer region between the assembling sections 46 and 53 of the clip 40 such that the assembling sections 46 and 53 of the clip 40 in which the motor body 22 is set fits in between the mounting walls 79 and 81.

Figure 8:
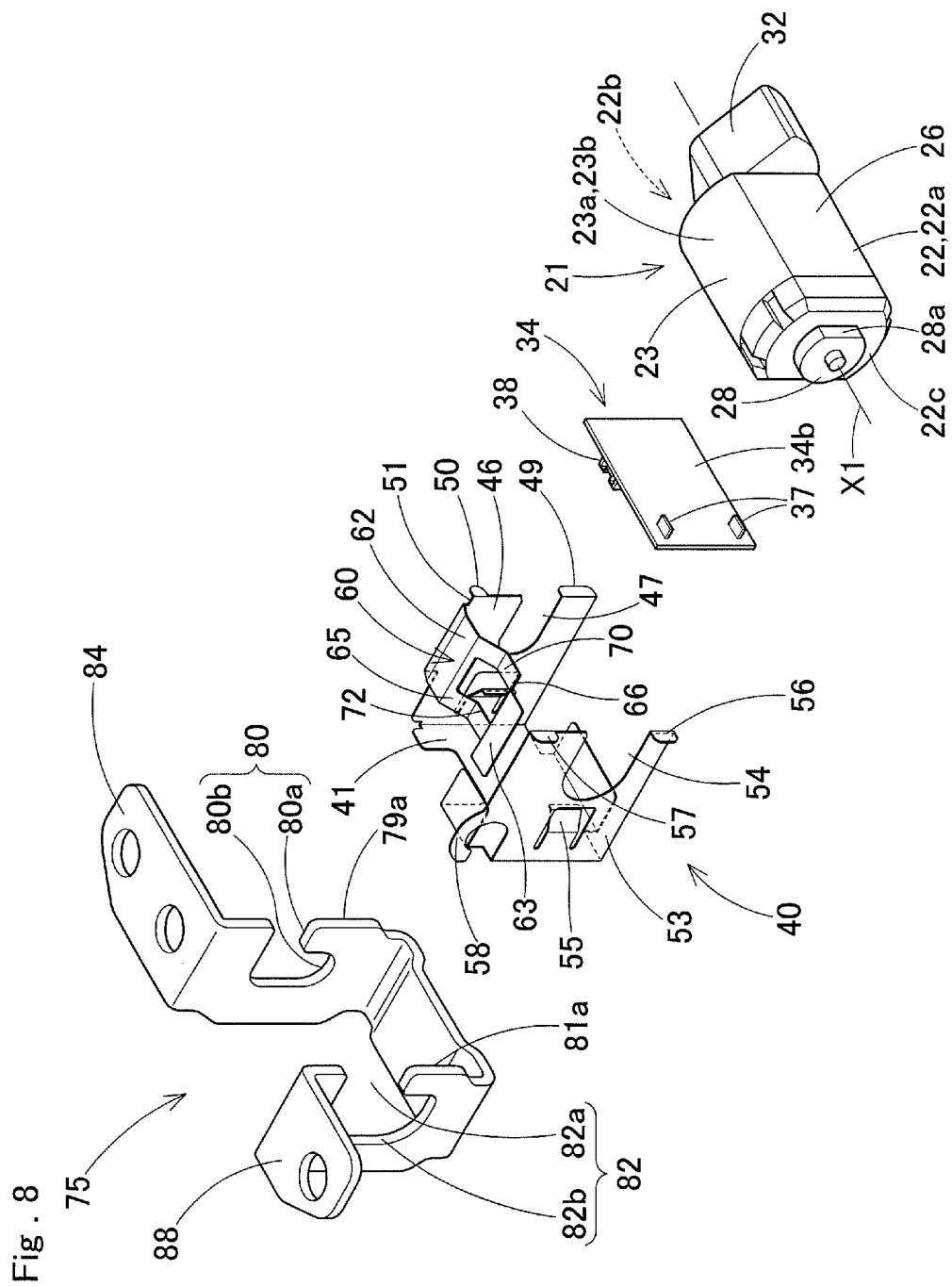
FIG. 8 is an exploded perspective view of the vibration device as viewed from the front of the vibration device (i.e., as viewed from the rear in a front and rear direction)
Figure 9:
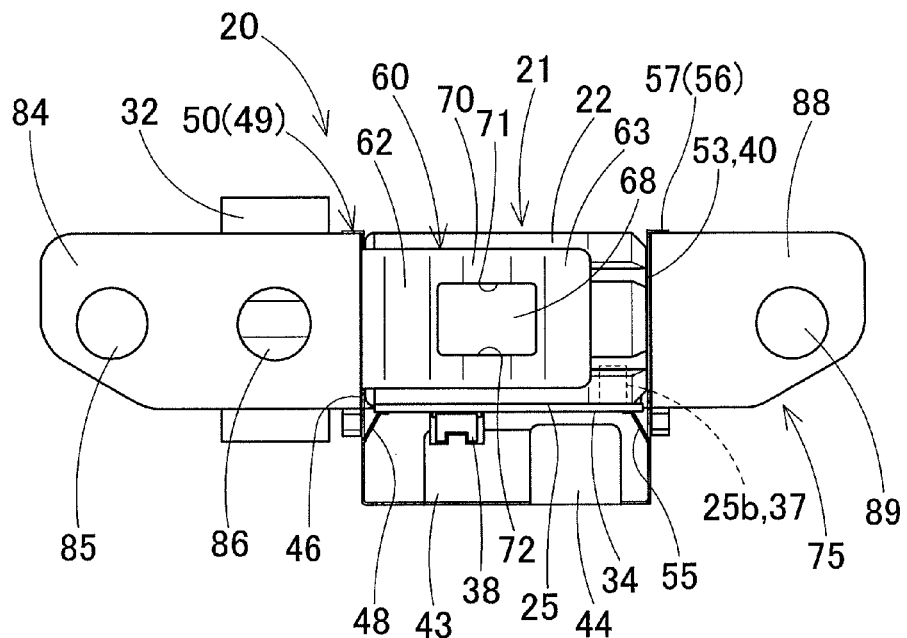
FIG. 9 is a plan view of the vibration device.
Figure 10:
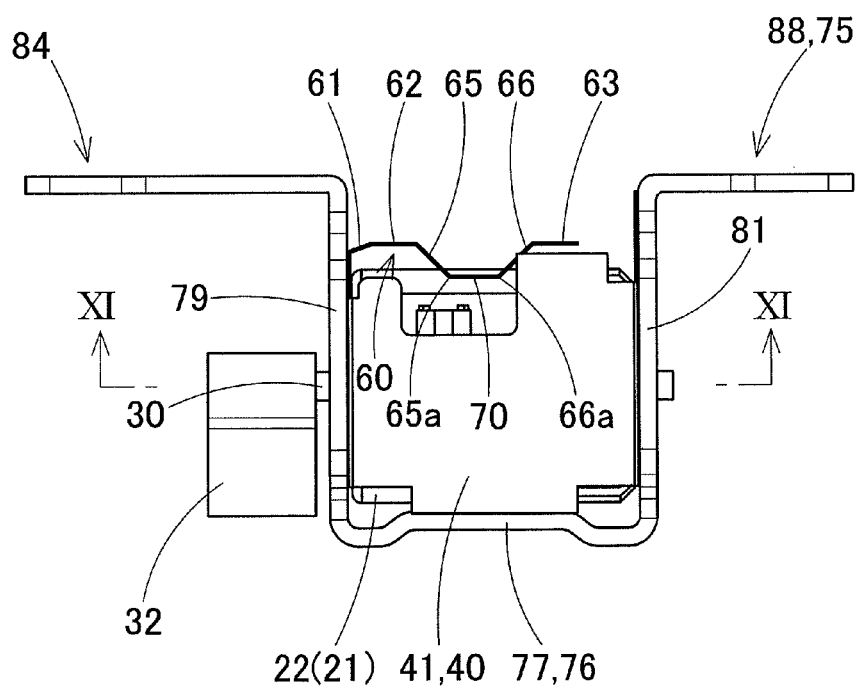
FIG. 10 is a front elevation of the vibration device.
Figure 20:
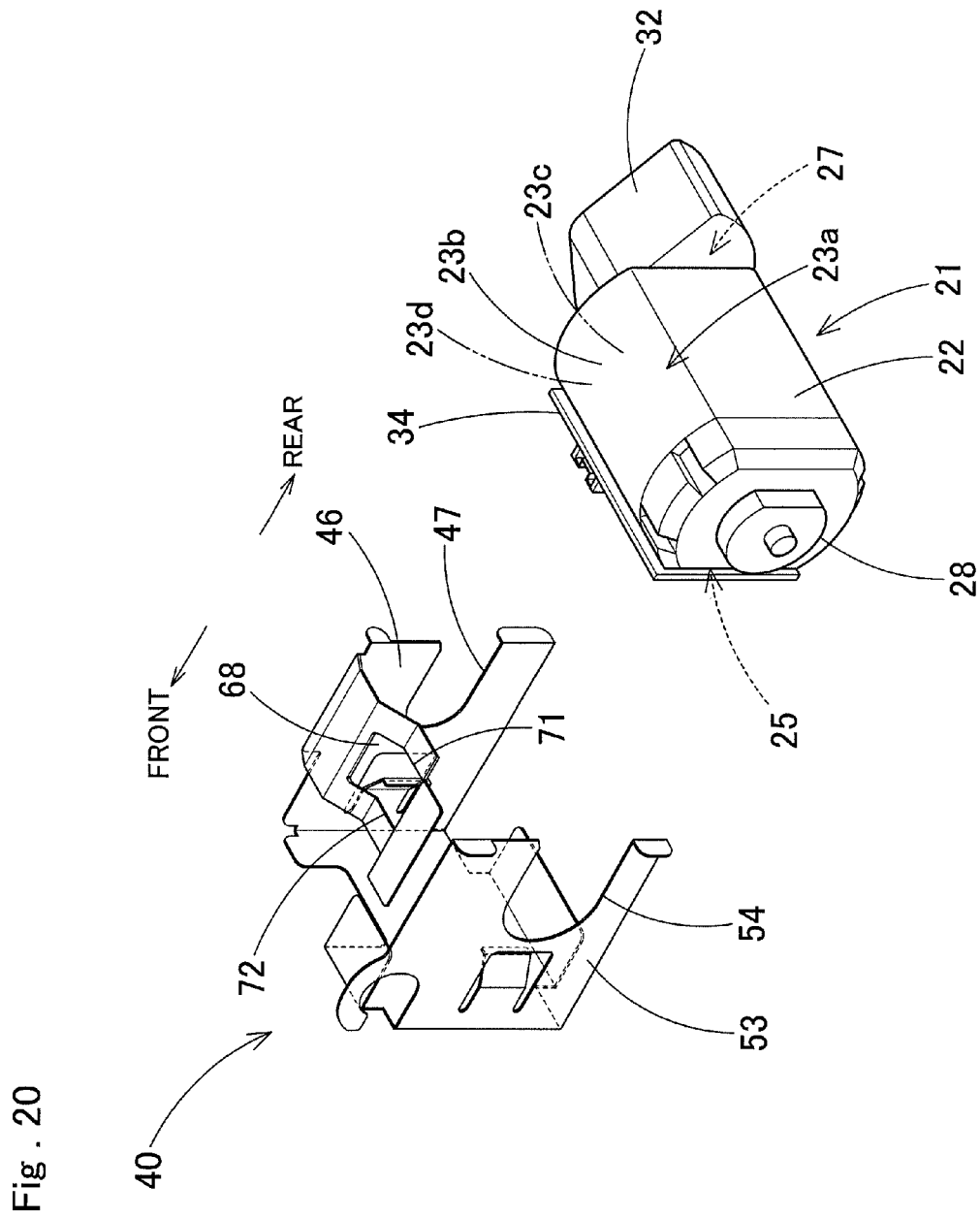
FIG. 20 is a perspective view of a vibration motor with which a circuit board is assembled.
Figure 21:
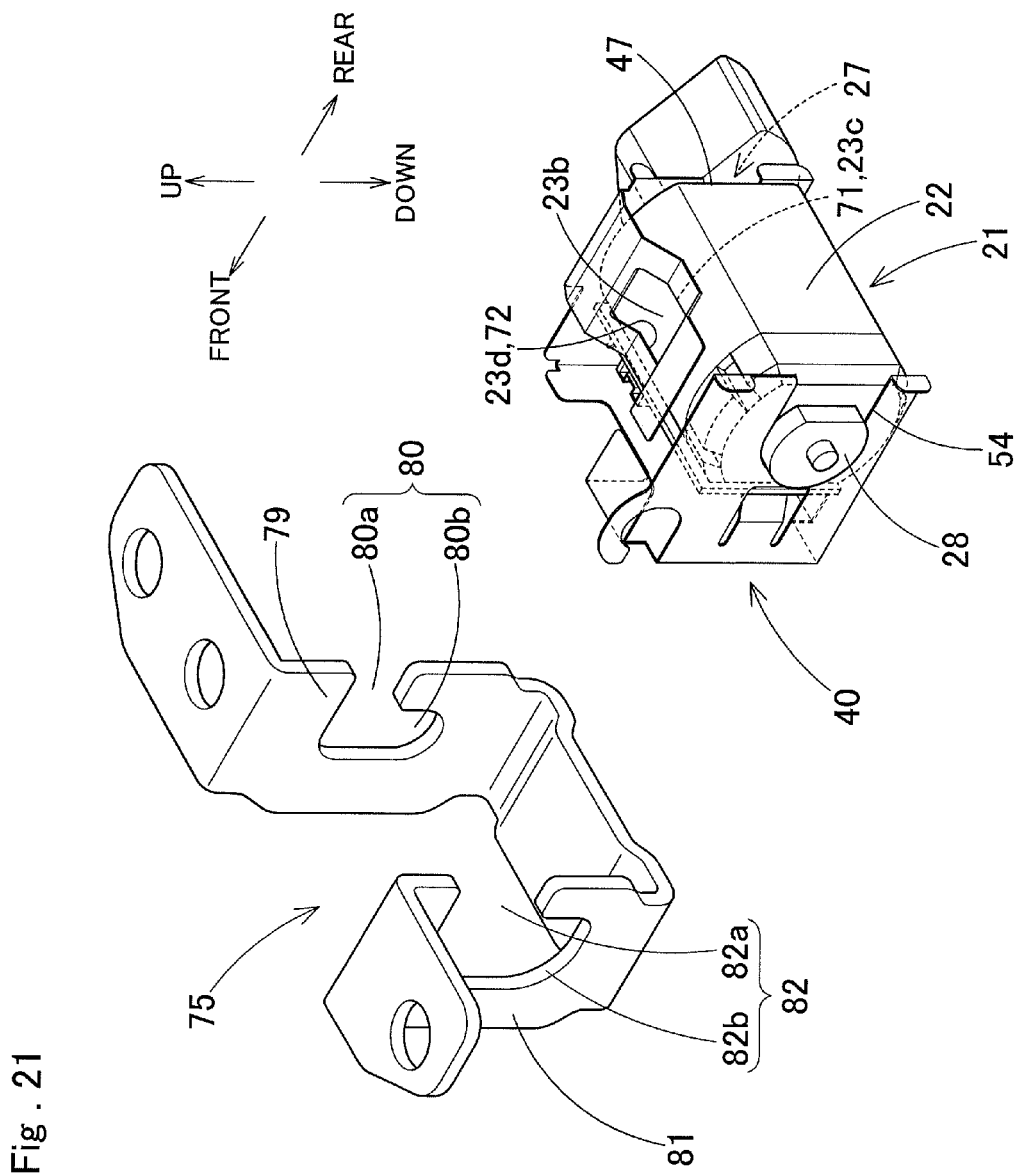
FIG. 21 is a perspective view of the vibration motor with which the circuit board and a clip are assembled.

The assembling (mounting) process of the vibration device 20 is now described. Firstly, as shown in FIGS. 7, 8 and 20, the circuit board 34 is mounted on the mounting base 25 by inserting the terminals 37 into the terminal holes 25b and applying the back face 34b of the circuit board 34 on the base plane 25a of the mounting base 25.

Subsequently, as shown in FIGS. 7, 8, 20 and 21, the clip 40 is assembled with the vibration motor 21 on which the circuit board 34 is mounted. Firstly, the motor body 22 is so laid that the circuit board 34 faces toward the connection wall 41 of the clip 40. If then the pivotally-support section 27 is pushed in up to the front end of the assembling recess 47 of the assembling section 46 and the pivotally-support section 28 is pushed in up to the front end of the assembling recess 54 of the assembling section 53 until the pivotally-support section 27 and 28 fit in the assembling recesses 47 and 48, respectively, the motor body 22 is assembled with the clip 40.

At this time, on the part of the spacer 60, the circular-arc planar outer circumference 23a of the approximate region 23 of the motor body 22 is housed in the housing hole 68, and the supporting edges 71 and 72 abut against and hold the circular-arc planar outer circumference 23a along the axial center X1, as shown in FIG. 4B. Regions 23c and 23d of the approximate region 23 supported by the supporting edges 71 and 72 are located on both sides of a projecting top 23b of the circular-arc planar outer circumference 23a of the approximate region 23 of the motor body 22. Therefore, the spacer 60 is engaged with the approximate region 23 of the motor body 22 and is prevented from slipping in a front and rear direction (i.e., in a direction perpendicular to the axial center X1), with the supporting edges 71 and 72 retained by vicinities of the projecting top 23b of the motor body 22.

Figure 15:
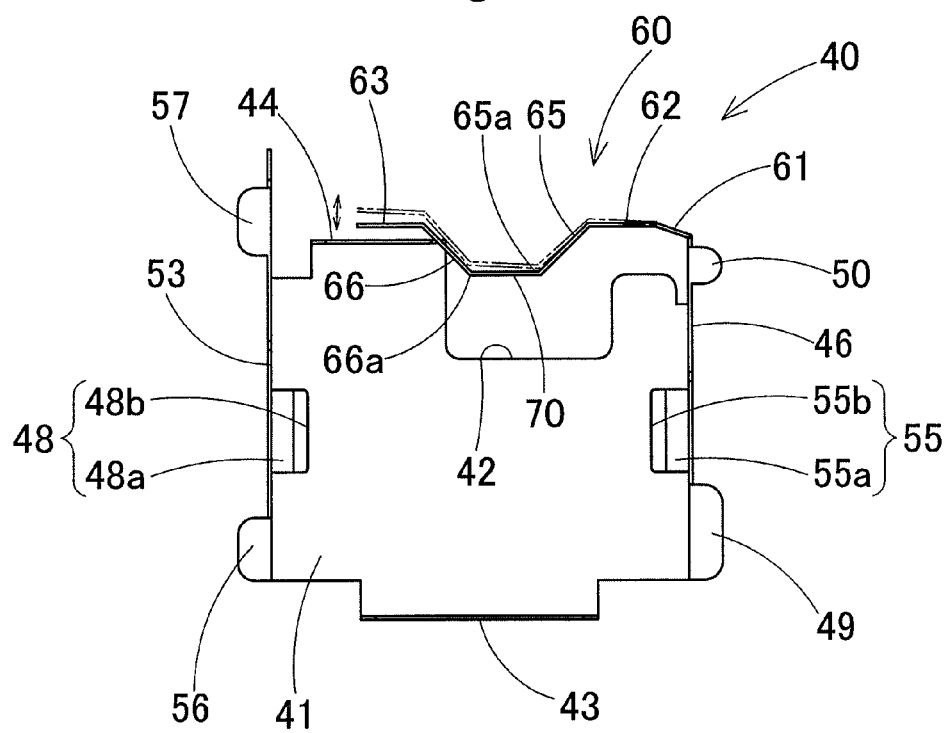
FIG. 15 is a rear view of the spacer.
Figure 16:
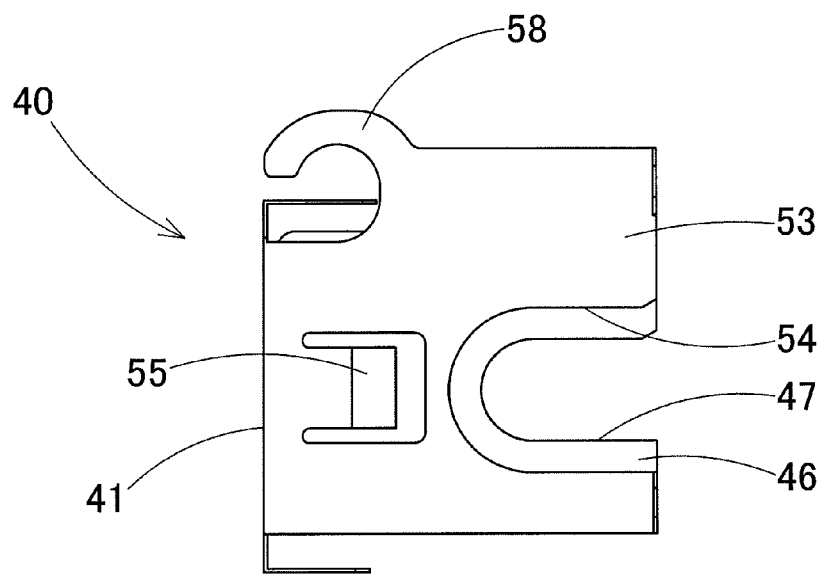
FIG. 16 is a left side view of the spacer.
Figure 17:
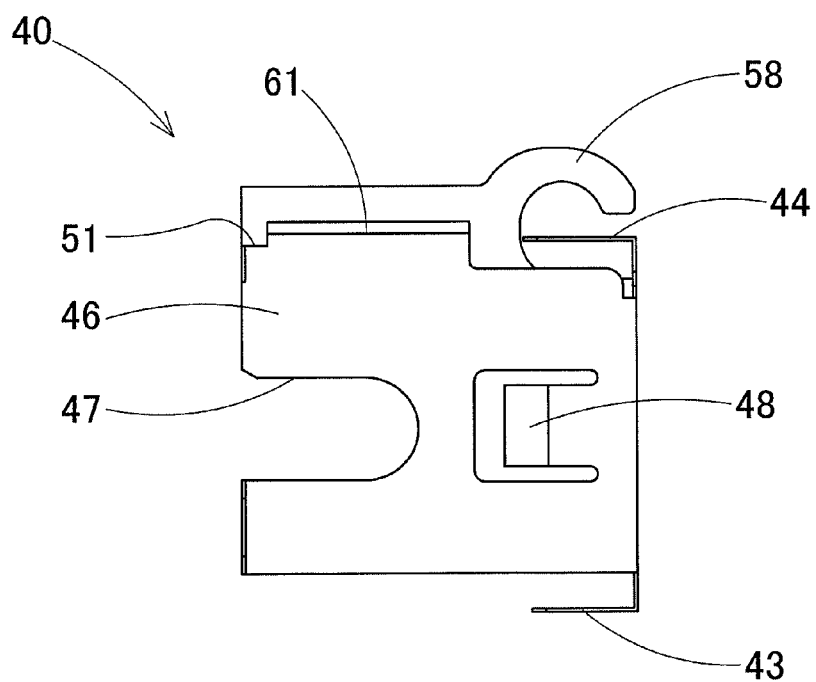
FIG. 17 is a right side view of the spacer.
Figure 18:
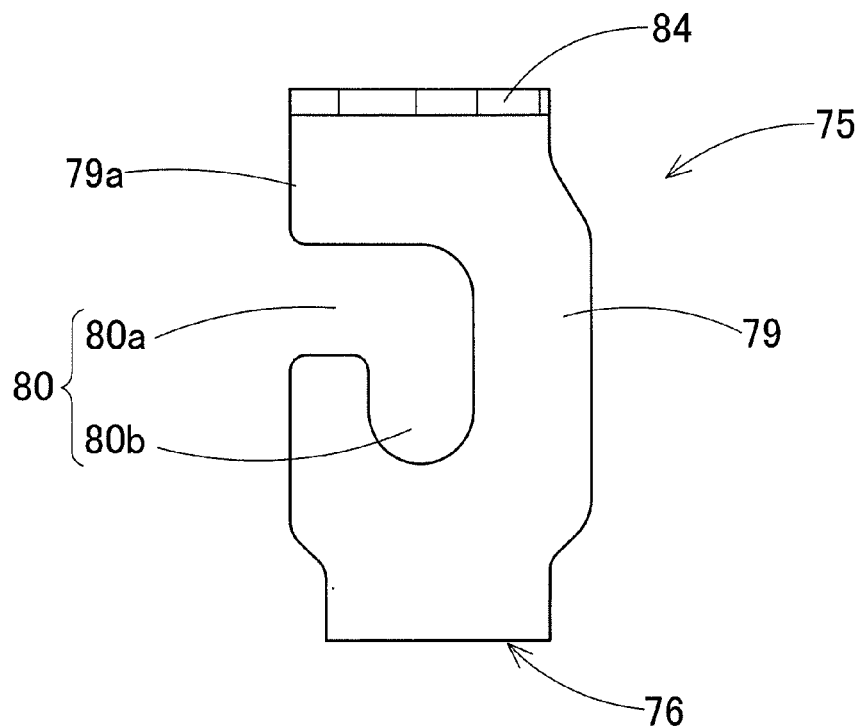
FIG. 18 is a right side view of a mounting bracket.
Figure 19:
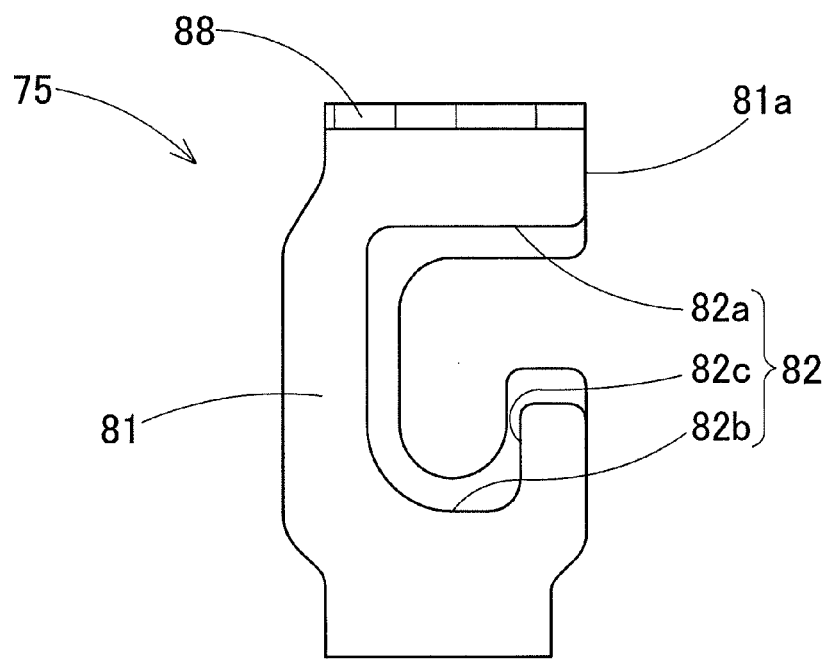
FIG. 19 is a left side view of the mounting bracket.

Housing of a region around the projecting top 23b of the motor body 22 in the housing hole 68 will be easy, since the spacer 60 is connected only to the assembling section 46 by only one core-side contact region 62 through the medium of the connecting region 61, and the connecting region 61 will bend and allow the core-side contact region 63, which is located away from the connecting region 61, to deform in such a manner as to move upward and then restore, as indicated by double-dotted lines in FIG. 15.

At this time, as shown in FIG. 11B, the contact regions 48b and 55b of the holding stops 48 and 55 of the assembling sections 46 and 53 press the right and left edges 35 and 36 of the surface 34a of the circuit board 34, thus prevent the circuit board 34 from coming off the motor body 22.

Figure 22B:
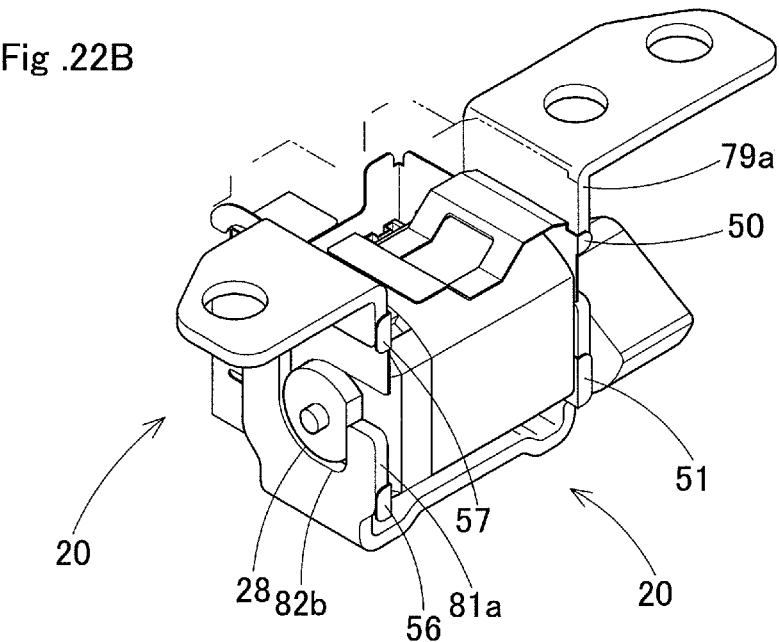

Thereafter, as shown in FIGS. 7, 8, 21 and 22A, the mounting bracket 75 is assembled with the vibration motor 21 on which the clip 40 is mounted. Firstly, the pivotally-support section 27, which protrudes out of the assembling recess 47 of the assembling section 46 of the clip 40, is inserted into the insertion opening 80a of the assembling recess 80 in the mounting wall 79 of the mounting bracket 75. In the meantime, the pivotally-support section 28 is inserted into the insertion opening 82a of the assembling recess 82. Then as shown in FIG. 22B, the pivotally-support sections 27 and 28 are moved downward and set in the fit-in regions 80b and 82b of the assembling recesses 80 and 82. Thus the mounting bracket 75 is assembled with the vibration motor 21, completing the assembling of the vibration device 20.

At this time, the retaining pawls 49 and 50 of the assembling section 46 of the clip 40 are retained at upper and lower regions of the rear end face 79a of the mounting wall 79 and the retaining pawls 56 and 57 of the assembling section 53 are retained at upper and lower regions of the rear end face 81a of the mounting wall 81. This configuration will prevent the clip 40 from rotating in a circumferential direction of the axial center X1 of the rotational axis 30 relative to the pressing section 76 of the mounting bracket 75. Further, if the retaining pawls 49, 50, 56 and 57 are retained by the rear end faces (retaining regions) 79a and 81a of the mounting bracket 75, the clip 40 will press the edges 35 and 36 of the circuit board 34 toward the motor body 22 with the aid of the contact regions 48b and 55b of the holding stops 48 and 55 which oppose the retaining pawls 49, 50, 56 and 57 in a front and rear direction, thus preventing the circuit board 34 from coming off the motor body 22 in a secure fashion.

Moreover, at completion of the assembling of the vibration device 20, the distant region 24 of the motor body 22 abuts against the pressing plane 77a of the pressing wall 77 of the mounting bracket 75.

Now the assembling of the steering wheel W is described. Firstly, the mounting tongue 84 of the mounting bracket 75 is located at the mounting base 6 of the mounting section 5 of the steering wheel body 1, while the mounting tongue 88 is located at the mounting base 7. At this time, by putting the projection 6c of the mounting base 6 in the fit-in hole 86 of the mounting tongue 84, the mounting hole 85 and mounting hole 6b, and the mounting hole 89 and mounting hole 7b are matched.

Figure 5B:
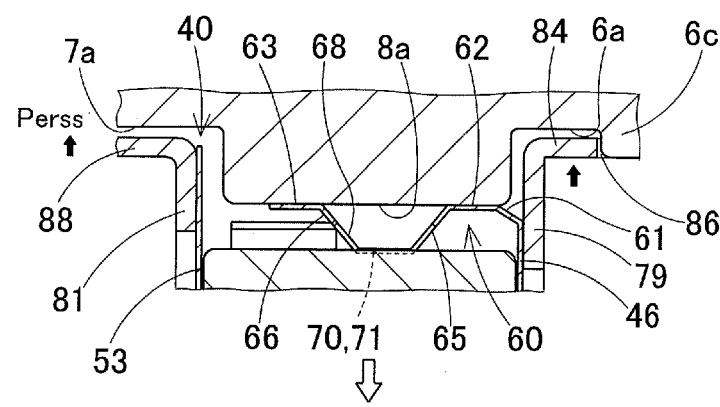
FIG. 5B illustrates the spacer before deforming.

At this time, at the spacer 60, the core-side contact regions 62 and 63 abut against the base plane 8a of the vibration receiving section 8 of the mounting section 5 of the steering wheel body 1 while the supporting edges 71 and 72 of the motor-side contact region 70 support the regions 23c and 23d of the approximate region 23 of the motor body 22, as shown in FIGS. 4B and 5B.

Figure 5C:
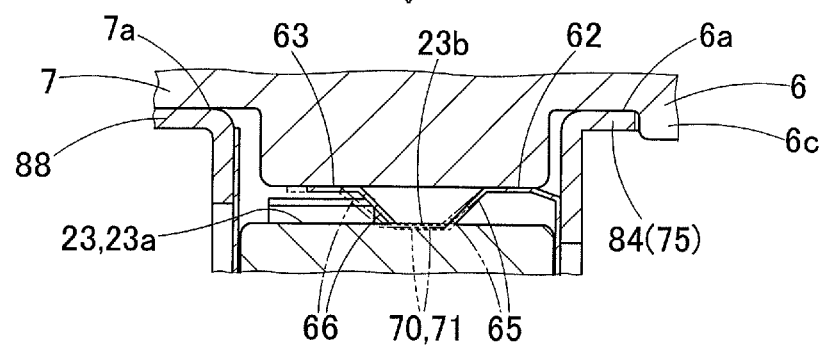
FIG. 5C illustrates the spacer in a deformed state.
Figure 6:
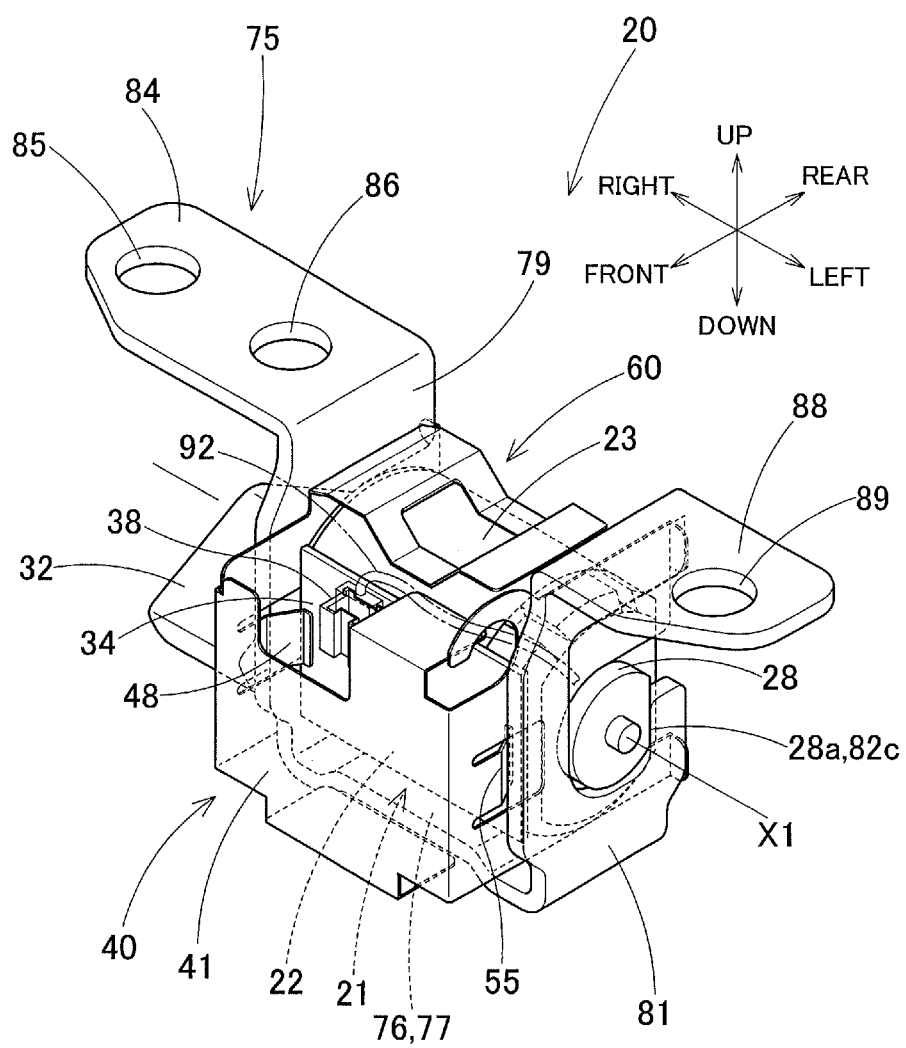
FIG. 6 is a perspective view of the vibration device.

If then the screws (fixing means) 11 are fastened into the mounting holes 85 and 6b and mounting holes 89 and 7b, the vibration device 20 is mounted on the steering wheel body 1 with the pressing plane 77a of the pressing wall 77 of the pressing section 76 abutting against the distant region 24 of the motor body 22 and thus having the mounting bracket 75 pressing the approximate region 23 of the motor body 22 against the vibration receiving section 8, as shown in FIGS. 4A and 4B by double-dotted lines, and as shown in FIG. 5C.

At this time, as the screws 11 are fastened, the legs 65 and 66 of the spacer 60 are deformed in such a manner as to open up from each other, in an up and down direction by an amount e (FIG. 4B), and the core-side contact regions 62 and 63 are forcefully pressed against the base plane 8a of the vibration receiving section 8, such that the approximate region 23 of the motor body 22 is connected to the vibration receiving section 8 in such a manner that vibration of the motor body 22 transmits to the vibration receiving section 8 in a synchronized fashion. In other words, the spacer 60 is elastically deformed considerably in an up and down direction by a deforming amount e to such an extent that the spacer 60 no longer deforms by the vibration of the motor body 22, such that the approximate region 23 of the motor body 22 is connected with the vibration receiving section 8 as if it was in direct contact with the vibration receiving section 8.

After the vibration device 20 is mounted on the steering wheel body 1, the lead wire 92 extending from an unillustrated repeater of the steering wheel body 1 is connected to the connector 38 through the hook 58. The lower cover 14 as well as predetermined functional components such as a cruise control device are mounted on the steering wheel body 1, and the steering shaft SS is secured to the boss 3a with a nut N. If then the pad 16 is mounted, the steering wheel W is mounted on a vehicle.

After the steering wheel W is mounted on board, if a predetermined alert system detects a departure of the vehicle from the lane, a voltage is supplied to the vibration motor 21 of the vibration device 20 via the lead wire 92 to rotate the rotational axis 30. Then the eccentric weight 32 rotates along with the rotational axis 30 such that the motor body 22 vibrates and transmits vibration to the vibration receiving section 8, and the vibration receiving section 8 becomes synchronized with the motor body 22 and cause a vibration on the ring section R. As a consequence, the driver holding the ring section R becomes aware of departure from the lane.

As described above, if the vibration motor 21 of the vibration device 20 is actuated, the motor body 22 vibrates with the eccentric weight 32 rotating. Since the pressing section 76 of the mounting bracket 75 presses the approximate region 23 on the outer circumference 22a of the motor body 22 against the vibration receiving section 8, vibration of the motor body 22 directly transmits to the vibration receiving section 8.

Mounted on the mounting section 5 which is located on a region of the core 2 continuous with the ring section R of the steering wheel body 1, the vibration receiving section 8 is capable of vibrating the ring section R effectively.

Therefore, with the steering wheel W of the embodiment, vibration caused by the vibration motor 21 effectively transmits to the ring section R.

In the steering wheel W of the foregoing embodiment, the mounting section 5 is formed on the transverse bar 4f of the spoke core section 4 of the spoke SB and the vibration motor 21 is so disposed that an axial center X1 of the rotational axis 30 extends parallel to the ring forming plane RP of the ring section R.

When the vibration motor 21 is actuated, since the leading end 30a of the rotational axis 30 with the eccentric weight 32 rotates about the axial center X1 of the rotational axis 30 while flexing, the motor body 22 vibrates in a direction perpendicular to the rotational axis 30. With the above-described configuration, since the axial center X1 of the rotational axis 30 is arranged parallel to the ring forming plane RP of the ring section R, the motor body 22 vibrates in a direction perpendicular to the ring forming plane RP, and so does the vibration receiving section 8 synchronized with the motor body 22. Further, since the ring section R is supported by the boss 3a of the boss section B secured to the steering shaft SS in a cantilevered fashion through the medium of the spokes S, if the vibration receiving section 8 vibrates in a direction perpendicular to the ring forming plane RP, the ring section R vibrates easily in a direction of the steering shaft SS. Furthermore, since the vibration of the motor body 22 occurs at the vibration receiving section 8 which is located on the spoke SB between the ring section R and the boss 3a of the boss section B as the supporting point, as shown in FIG. 3, the vibration transmits to the ring section R in an amplified fashion in direct proportion of a distance BM between the boss 3a and the motor body 22 to a distance BR between the boss 3a and the ring section R.

As a consequence, the configuration of the above embodiment is capable of generating a great (strong) and sufficiently perceivable vibration at the ring section R even if the vibration of the vibration motor 21 is small (weak).

Without considering such advantageous effects, the axial center X1 of the rotational axis 30 may be arranged parallel to an axial center of the steering shaft SS, instead of parallel to the ring forming plane RP of the ring section R.

The steering wheel W of the foregoing embodiment further includes an elastically deformable spacer 60 between the vibration receiving section 8 and the approximate region 23 of the outer circumference 22a of the motor body 22 which faces the vibration receiving section 8. The spacer 60 is in such an elastically deformed state with a repulsive force as to be capable of transmitting vibration of the motor body 22 to the vibration receiving section 8, as a result of fastening of the screws 11 such that the pressing plane 77a of the pressing section 76 of the mounting bracket 75 presses the distant region 24 toward the vibration receiving section 8 and the approximate region 23 approximates to the vibration receiving section 8.

With this configuration, the spacer 60, by its elastic deformation allowance, absorbs any assembling error which can arise between the vibration receiving section 8 of the steering wheel body 1 and the motor body 22 pressed against the vibration receiving section 8 by the pressing section 76 of the mounting bracket 75 due to a dimension error in the mounting tongues 84, 88 and the pressing section 76 of the mounting bracket 75, or in the base planes 6a, 7a and 8a of the mounting bases 6, 7 and the vibration receiving section 8 of the steering wheel body 1. Moreover, since the spacer 60 is so elastically deformed as to be capable of transmitting vibration of the motor body 22 to the vibration receiving section 8 (in other words, since the spacer 60 is elastically deformed considerably in an up and down direction by a deforming amount e to such an extent that the spacer 60 no longer deforms by the vibration of the motor body 22), the spacer 60 is capable of transmitting vibration of the motor body 22 to the vibration receiving section 8 adequately.

Furthermore, in the steering wheel W of the foregoing embodiment, the approximate region 23 of the motor body 22 includes the circular-arc planar outer circumference 23a extending about the axial center X1 of the rotational axis 30. The spacer 60 is composed of a flat spring material and includes the core-side contact regions 62 and 63, the legs 65 and 66, the motor-side contact region 70, the housing hole 68, the supporting edges 71 and 72 and the assembling section 46. The core-side contact regions 62 and 63 are located at opposite end regions in a left and right direction of the spacer 60 for abutment against the vibration receiving section 8. The legs 65 and 66 extend toward the motor body 22 from opposing edges of the core-side contact regions 62 and 63. The motor-side contact region 70 is so formed as to connect leading ends 65a and 66a of the legs 65 and 66 together. The housing hole 68 penetrates the motor-side contact region 70 and legs 65 and 66 for housing a region around the projecting top 23d, i.e., part of a circular-arc planar outer circumference 23a of the approximate region 23 of the motor body 22. The supporting edges 71 and 72 are composed of opposite edges of the motor-side contact region 70 which oppose each other in a direction perpendicular to the axial center X1 of the rotational axis 30 in a periphery of the housing hole 68 and abut against and support the circular-arc planar outer circumference 23a of the approximate region 23 of the motor body 22 along the axial center X1 of the rotational axis 30. The assembling section 46 extends from the core-side contact region 62 and is clamped between the mounting wall 79 of the pressing section 76 and the end plane 22b of the motor body 22 so as to be assembled with the pivotally-support section 27 of the motor body 22 with the aid of the assembling recess 47.

With this configuration, when assembling the vibration device 20, if the assembling section 46 extending from the spacer 60 is assembled with the motor body 22 such that the approximate region 23 of the motor body 22 fits in the housing hole 68 of the spacer 60 and the motor body 22 is set in the pressing section 76 of the mounting bracket 75, and then the core-side contact regions 62 and 63 of the spacer 60 are applied against the vibration receiving section 8 so the approximate region 23 of the motor body 22 faces the vibration receiving section 8, and then the mounting tongues 84 and 88 are secured to the mounting section 5, the pressing section 76 of the mounting bracket 75 presses the distant region 24 of the motor body 22 toward the vibration receiving section 8.

At this time, the spacer 60 is fixed between the vibration receiving section 8 and the approximate region 23 of the motor body 22 with the supporting edges 71 and 72 of the motor-side contact region 70 abutting against the approximate region 23 of the motor body 22 and with the core-side contact regions 62 and 63 contacting the vibration receiving section 8 and is elastically deformed by the legs 65 and 66 in an opening fashion in such a manner as to transmit a vibration of the motor body 22 to the vibration receiving section 8.

Moreover, when the motor body 22, the clip 40 and the mounting bracket 75 are assembled together, since the supporting edges 71 and 72 opposing each other in a periphery of the housing hole 68 abut against the circular-arc planer outer circumference 23a of the approximate region 23 of the motor body 22 along the axial center X1 of the rotational axis 30, the spacer 60 will be fixedly positioned between the approximate region 23 of the motor body 22 and the vibration receiving section 8 without slipping in a circumferential direction of the motor body 22. Further, since the assembling section 46 is clamped between the end plane 22b of the motor body 22 and the mounting wall 79 of the pressing section 76 of the mounting bracket 75, the spacer 60 will not come off the motor body 22 when the mounting tongues 84 and 88 are mounted on the mounting bases 6 and 7 of the core 2.

With this configuration, having the approximate region 23 of the motor body 22 fitted in the housing hole 68, the spacer 60 will be assembled with the vibration motor 21 with no fear of slipping. Accordingly, if the vibration motor 21 is set in the pressing section 76 of the mounting bracket 75 and the mounting tongues 84 and 88 are mounted on the corresponding mounting bases 6 and 7 with the aid of the screws (fixing means) 11, the vibration device 20 will be easily mounted on the steering wheel body 1 with no separate means for holding the spacer 60, in such a manner that the vibration motor 21 is capable of pressing the vibration receiving section 8.

In the foregoing embodiment, the spacer 60 is integrated into the clip 40 having the holding stops 48 and 55 for holding the circuit board 34. However, the spacer 60 may be configured with an assembling section 46 with no holding stop 48. In this instance, the spacer 60 may also include an assembling section 53 which extends from the core-side contact region 63 and has no holding stop 55.

It will also be appreciated that the spacer according to the invention is composed only of a region of the spacer 60 in the clip 40.

Further, the spacer may be composed of such polymer elastomer as silicone rubber instead of flat spring material on condition that it has durability and is capable of transmitting vibration of the motor body 22 to the vibration receiving section 8.

Of course, a spacer will not be necessary if a mounting bracket with a pressing section is capable of pressing the distant region 24 of the motor body 22 toward the vibration receiving section 8 such that the approximate region 23 of the motor body 22 contacts the vibration receiving section 8 directly and vibration of the motor body 22 transmits to the vibration receiving section 8 without causing such noise as fluttering noise during driving.

What is claimed is:

1. A steering wheel comprising a steering wheel body and a vibration device which transmits vibration to a driver,
   wherein the steering wheel body comprises:
      a generally annular ring section for holding for steering;
      a boss section disposed at a center of the ring section and secured to a steering shaft;
      a spoke interconnecting the ring section and the boss section; and
      a core having a contour that interconnects the ring section, the boss section and the spoke;
   wherein the vibration device comprises:
      a vibration motor that includes a motor body, a rotational shaft protruding out of the motor body and an eccentric weight attached to the rotational shaft, the motor body has an outer circumferential surface, and the vibration motor is disposed with an axial center of the rotational shaft extending parallel to a ring forming plane of the ring section; and
      a mounting bracket that mounts the vibration motor on a r counting section formed at a region continuous with the ring section on the core, and the mounting section is located at a region of the spoke of the core;
   wherein the mounting section comprises:
      a vibration receiving section that receives vibration of the motor body of the vibration device motor and transmits vibration directly to the steering wheel body; and
      a pair of mounting bases that are located on opposite sides of the vibration receiving section;
   wherein the mounting bracket comprises:
      a pressing section on which the motor body is disposed, where an approximate region of the outer circumferential surface of the motor body faces the vibration receiving section, and a distal region of the outer circumferential surface of the motor body faces the pressing section, and the pressing section of the mounting bracket has a U-shaped sectional shape and includes a pressing wall which includes a pressing plane that abuts against and presses the distant region of the motor body and a pair of mounting walls that are opposed to each other and connected together by the pressing wall; and
      a pair of mounting tongues that extend from opposite sides of the pressing section and are secured to the pair of mounting bases of the mounting section with fixing means; the motor body being disposed on the pressing section and between the pair of mounting tongues, the pressing section contacting and pressing the distal region of the outer circumferential surface of the motor body toward the vibration receiving section and the approximate region of the outer circumferential surface of the motor body pressing against and being approximated to the vibration receiving section, and the mounting tongues of the mounting bracket extend toward left and right from upper ends of the mounting walls of the pressing section.

2. The steering wheel of claim 1, wherein base planes of the mounting bases and a base plane of the vibration receiving section are parallel to the ring forming plane of the ring section.

3. A steering wheel comprising a steering wheel body and a vibration device which transmits vibration to a driver,
   wherein the steering wheel body comprises:
      a generally annular ring section for holding for steering;
      a boss section disposed at a center of the ring section and secured to a steering shaft;
      a spoke interconnecting the ring section and the boss section; and
      a core having a contour that interconnects the ring section, the boss section and the spoke;
   wherein the vibration device comprises:
      a vibration motor that includes a motor body, a rotational shaft protruding out of the motor body and an eccentric weight attached to the rotational shaft, the motor body has an outer circumferential surface, and the vibration motor is disposed with an axial center of the rotational shaft extending parallel to a ring forming plane of the ring section; and
      a mounting bracket that mounts the vibration motor on a mounting section formed at a region continuous with the ring section on the core, and the mounting section is located at a region of the spoke of the core;
   wherein the mounting section comprises:
      a vibration receiving section that receives vibration of the motor body of the vibration device motor and transmits vibration directly to the steering wheel body; and
      a pair of mounting bases that are located on opposite sides of the vibration receiving section;
   wherein the mounting bracket comprises:
   a pressing section on which the motor body is disposed, where an approximate region of the outer circumferential surface of the motor body faces the vibration receiving section, and a distal region of the outer circumferential surface of the motor body faces the pressing section; and
   a pair of mounting tongues that extend from opposite sides of the pressing section and are secured to the pair of mounting bases of the mounting section with fixing means; the motor body being disposed on the pressing section and between the pair of mounting tongues, the pressing section contacting and pressing the distal region of the outer circumferential surface of the motor body toward the vibration receiving section and the approximate region of the outer circumferential surface of the motor body pressing against and being approximated to the vibration receiving section; and
   wherein base planes of the mounting bases and a base plane of the vibration receiving section are parallel to the ring forming plane of the ring section.

* * * * *